(12) United States Patent
Kusama et al.

(10) Patent No.: US 11,990,830 B2
(45) Date of Patent: May 21, 2024

(54) POWER CONVERSION SYSTEM AND VIRTUAL DC VOLTAGE GENERATOR CIRCUIT

(71) Applicant: Panasonic Intellectual Property Management Co., Ltd., Osaka (JP)

(72) Inventors: Fumito Kusama, Kanagawa (JP); Takaaki Norisada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

(21) Appl. No.: 17/440,702

(22) PCT Filed: Mar. 5, 2020

(86) PCT No.: PCT/JP2020/009526
§ 371 (c)(1),
(2) Date: Sep. 17, 2021

(87) PCT Pub. No.: WO2020/189317
PCT Pub. Date: Sep. 24, 2020

(65) Prior Publication Data
US 2022/0173652 A1 Jun. 2, 2022

(30) Foreign Application Priority Data

Mar. 18, 2019 (JP) .................................. 2019-050368

(51) Int. Cl.
*H02M 1/00* (2006.01)
*H02M 1/34* (2007.01)
(Continued)

(52) U.S. Cl.
CPC ............ *H02M 1/007* (2021.05); *H02M 1/344* (2021.05); *H02M 3/158* (2013.01);
(Continued)

(58) Field of Classification Search
CPC ........ H02M 1/007; H02M 1/08; H02M 3/158; H02M 3/33576; H02M 7/53871
See application file for complete search history.

(56) References Cited

U.S. PATENT DOCUMENTS

| 2009/0086520 A1* | 4/2009 | Nishimura | ........ H02M 3/33576 363/133 |
| 2014/0117872 A1* | 5/2014 | Finley | .................. H01J 37/3405 323/229 |

(Continued)

FOREIGN PATENT DOCUMENTS

| JP | 2007-221892 A | 8/2007 |
| JP | 2014-017917 A | 1/2014 |

(Continued)

OTHER PUBLICATIONS

International Search Report issued in corresponding International Patent Application No. PCT/JP2020/009526, dated Jun. 16, 2020, with English translation.

*Primary Examiner* — Jue Zhang
(74) *Attorney, Agent, or Firm* — Rimon P.C.

(57) ABSTRACT

A power conversion system according to the present disclosure includes a first circuit, a second circuit, and a third circuit. A first internal terminal, a second internal terminal, and a third internal terminal are electrically connected to the same connection unit. The third circuit provides an output voltage across a secondary winding of a transformer via a switching element and the transformer. The secondary winding is electrically connected to the third internal terminal. The output voltage has a waveform including a rising range in which the output voltage changes from a first potential to a second potential, a falling range in which the output voltage changes from the second potential to the first poten- (Continued)

tial, and a flat range in which the output voltage is maintained at either the first potential or the second potential.

17 Claims, 13 Drawing Sheets

(51) Int. Cl.
*H02M 3/158* (2006.01)
*H02M 3/335* (2006.01)
*H02M 7/5387* (2007.01)
*H02M 1/08* (2006.01)

(52) U.S. Cl.
CPC ... *H02M 3/33576* (2013.01); *H02M 7/53871* (2013.01); *H02M 1/08* (2013.01)

(56) References Cited

U.S. PATENT DOCUMENTS

| | | |
|---|---|---|
| 2017/0201092 A1 | 7/2017 | Minato |
| 2018/0287511 A1 | 10/2018 | Ayai |

FOREIGN PATENT DOCUMENTS

| | | |
|---|---|---|
| JP | 2016-025713 A | 2/2016 |
| JP | 2017-112681 A | 6/2017 |
| WO | 2017/068814 A1 | 4/2017 |

* cited by examiner

POWER CONVERSION SYSTEM AND VIRTUAL DC VOLTAGE GENERATOR CIRCUIT

CROSS-REFERENCE OF RELATED APPLICATIONS

This application is the U.S. National Phase under 35 U.S.C. § 371 of International Patent Application No. PCT/JP2020/009526, filed on Mar. 5, 2020, which in turn claims the benefit of Japanese Application No. 2019-050368, filed on Mar. 18, 2019, the entire disclosures of which Applications are incorporated by reference herein.

TECHNICAL FIELD

The present disclosure generally relates to a power conversion system and a virtual DC voltage generator circuit, and more particularly relates to a power conversion system for converting power either unidirectionally or bidirectionally and a virtual DC voltage generator circuit.

BACKGROUND ART

Patent Literature 1 discloses a power converter (power conversion system) which may be connected to a solar power generation panel. The power converter of Patent Literature 1 is configured to convert DC power into AC power and includes a DC/DC converter and a DC/AC converter. The DC/AC converter is connected to the DC/DC converter via an intermediate bus. An intermediate capacitor is connected to the intermediate bus.

The power converter of Patent Literature 1 needs a smoothing capacitor (as an intermediate capacitor) to connect the DC/DC converter and the DC/AC converter on the DC side.

CITATION LIST

Patent Literature

Patent Literature 1: WO 2017/068814 A1

SUMMARY OF INVENTION

An object of the present disclosure is to provide a power conversion system and a virtual DC voltage generator circuit, both of which allow a plurality of circuits to be connected on the DC side without using a smoothing capacitor.

A power conversion system according to an aspect of the present disclosure includes a first circuit and a second circuit and transmits power between a first internal terminal of the first circuit and a second internal terminal of the second circuit. The first circuit includes the first internal terminal and a first external terminal and has the first external terminal electrically connected to either an AC power supply or an AC load. The second circuit includes at least the second internal terminal. The power conversion system further includes a third circuit. The third circuit includes a third internal terminal and a third external terminal. In the power conversion system, the first internal terminal, the second internal terminal, and the third internal terminal are electrically connected to the same connection unit. The third circuit includes a switching element and a transformer electrically connected to the switching element. The third circuit is configured to provide an output voltage across a secondary winding of the transformer via the switching element and the transformer. The secondary winding is electrically connected to the third internal terminal. The output voltage has a waveform including a rising range, a falling range, and a flat range. In the rising range, the output voltage changes from a first potential to a second potential higher than the first potential. In the falling range, the output voltage changes from the second potential to the first potential. In the flat range, the output voltage is maintained at either the first potential or the second potential.

A virtual DC voltage generator circuit according to another aspect of the present disclosure is used as the third circuit in the power conversion system.

DESCRIPTION OF EMBODIMENTS

First Embodiment (1) Overview

An overview of a power conversion system 10 according to an exemplary embodiment will be described with reference to FIG. 1.

Figure 1:
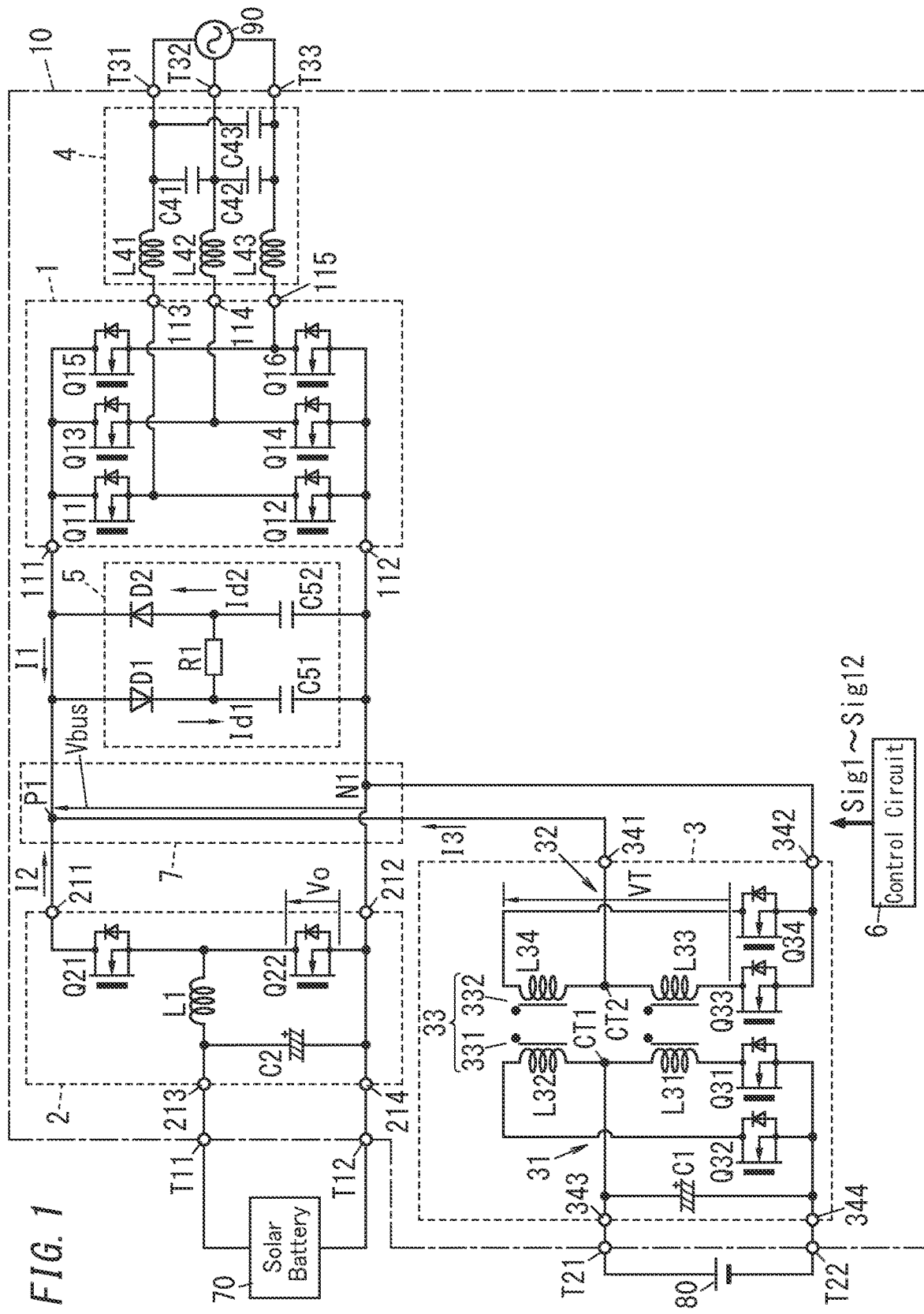
FIG. 1 is a circuit diagram of a virtual DC voltage generator circuit and power conversion system according to a first embodiment of the present disclosure.

A power conversion system 10 according to this embodiment is a system for performing power conversion between first DC terminals T11, T12, second DC terminals T21, T22, and AC terminals T31, T32, T33 as shown in FIG. 1. A solar battery 70 is electrically connected to the first DC terminals T11, T12. A storage battery 80 is electrically connected to the second DC terminals T21, T22. A power grid 90 is electrically connected to the AC terminals T31, T32, T33. As used herein, the "power grid" refers to an overall system that allows an electric power supplier such as an electric power company to supply electric power to a customer's power receiving equipment.

The power conversion system 10 according to this embodiment converts DC power supplied from at least one of the solar battery 70 or the storage battery 80 into AC power having three phases (namely, a U-phase, a V-phase, and a W-phase) and outputs (transmits) the AC power to the power grid 90. In addition, the power conversion system 10 also converts the AC power supplied from the power grid 90 into DC power and outputs the DC power to the storage battery 80.

In other words, while the solar battery 70 is generating power or while the storage battery 80 is discharging, the power conversion system 10 converts the DC power supplied from the solar battery 70 or the storage battery 80 into AC power and outputs the AC power to the power grid 90. In this case, each of the solar battery 70 and the storage battery 80 serves as a "DC power supply" and the power grid 90 serves as a "three-phase AC load (AC load)" having a U-phase, a V-phase, and a W-phase. On the other hand, while the storage battery 80 is charging, the power conversion system 10 converts the AC power supplied from the power grid 90 into DC power and outputs the DC power to the storage battery 80. In this case, the storage battery 80 serves as a "DC load" and the power grid 90 serves as a "three-phase AC power supply (AC power supply)" having the U-phase, the V-phase, and the W-phase.

The power conversion system 10 according to this embodiment includes a first circuit 1 and a second circuit 2 as shown in FIG. 1 and transmits power between first internal terminals 111, 112 of the first circuit 1 and second internal terminals 211, 212 of the second circuit 2. The first circuit 1 includes the first internal terminals 111, 112 and first external terminals 113-115 and has the first external terminals 113-115 electrically connected to the power grid 90. The second circuit 2 includes at least the second internal terminals 211, 212. In this embodiment, the second circuit 2 includes the second internal terminals 211, 212 and second external terminals 213, 214.

The power conversion system 10 further includes a third circuit 3. The third circuit 3 includes third internal terminals 341, 342 and third external terminals 343, 344. In the power conversion system 10, the first internal terminals 111, 112, the second internal terminals 211, 212, and the third internal terminals 341, 342 are electrically connected to the same connection unit 7. The third circuit 3 includes switching elements Q31-Q34 and a transformer 33 electrically connected to the switching elements Q31-Q34. The third circuit 3 provides an output voltage VT across a secondary winding 332 of the transformer 33 via the switching elements Q31-Q34 and the transformer 33. The secondary winding 332 is electrically connected to the third internal terminals 341, 342. The output voltage VT has a waveform W1 (see FIG. 2) including a rising range W11 (see FIG. 2), a falling range W13 (see FIG. 2), and a flat range W12 (see FIG. 2). In the rising range W11, the output voltage VT changes from a first potential VT1 (see FIG. 2) to a second potential VT2 (see FIG. 2) higher than the first potential VT1. In the falling range W13, the output voltage VT changes from the second potential VT2 to the first potential VT1. In the flat range W12, the output voltage VT is maintained at either the first potential VT1 or the second potential VT2. As used herein, if a waveform range is "flat," then the waveform range may naturally be flat in its entirety but may also have subtle variations at least locally. Thus, even if the flat range W12 of the waveform W1 of the output voltage VT has some subtle variations, the flat range W12 may also be herein regarded as being flat.

Also, a virtual DC voltage generator circuit 3 according to this embodiment may be used as the third circuit 3 in this power conversion system 10.

As described above, in the power conversion system 10 according to this embodiment, the third circuit 3 provides the output voltage VT across the secondary winding 332 of the transformer 33. This allows a DC voltage corresponding to the flat range W12 of the output voltage VT to be generated in the connection unit 7. Thus, the first circuit 1 and the second circuit 2 may be connected on the DC side with no smoothing capacitors used.

Also, in a known power conversion system, to smooth out ripples caused on the DC side by AC components having a commercial frequency, for example, of a power supply or a load on the AC side, a capacitor with large capacitance is provided for the connection unit 7. In contrast, in the power conversion system 10 according to this embodiment, the role of smoothing out the ripples may be played by either capacitors C1, C2 or the storage battery 80, thus requiring providing no smoothing capacitors for the connection unit 7.

In the following description of an exemplary embodiment, the power conversion system 10 will be described as being introduced into a non-dwelling facility such as an office building, a hospital, a commercial facility, or a school.

In recent years, in particular, there has been a growing trend for a corporation or an individual person to "sell electricity" by causing a reverse power flow of the power obtained from a distributed power supply (such as the solar battery 70, the storage battery 80, or a fuel cell) toward a commercial power grid. Selling electricity is realized by connecting the distributed power supply to the commercial power grid. When the grid connection is made, the power generated by the distributed power supply is converted into power adapted to the commercial power grid by using a power conversion system 10 called a "power conditioner." The power conversion system 10 according to this embodiment may be used, for example, as a power conditioner to convert DC power into three-phase AC power, or vice versa, between the solar battery 70 and the storage battery 80 as a distributed power supply and the power grid 90.

(2) Configuration

Next, a configuration for the power conversion system 10 according to this embodiment will be described with reference to FIG. 1.

As shown in FIG. 1, the power conversion system 10 according to this embodiment includes a first circuit 1, a second circuit 2, and a third circuit 3. The power conversion system 10 performs power conversion between two first DC terminals T11, T12, two second DC terminals T21, T22, and three AC terminals T31, T32, T33. To the first DC terminals T11, T12, electrically connected is a solar battery 70 serving as a DC power supply. To the second DC terminals T21, T22, electrically connected is a storage battery 80 serving as either a DC power supply or a DC load. To the AC terminals T31, T32, T33, electrically connected is a power grid 90 serving as either a three-phase AC power supply or three-phase AC load, each having the U-phase, the V-phase, and the W-phase.

The power conversion system 10 further includes a filter circuit 4, a snubber circuit 5, a control circuit 6, and a connection unit 7. The power conversion system 10 may further include the two first DC terminals T11, T12, the two second DC terminals T21, T22, and the three AC terminals T31, T32, T33. Alternatively, the two first DC terminals T11, T12, the two second DC terminals T21, T22, and the three AC terminals T31, T32, T33 do not have to be among constituent elements of the power conversion system 10. Furthermore, as used herein, the "terminal" does not have to be a component to which an electric wire, for example, is connected but may also be a lead of an electronic component or a part of a conductor included in a circuit board, for example.

(2.1) First Circuit

The first circuit 1 may be, for example, a DC/AC converter. Specifically, the first circuit 1 may be a three-phase inverter circuit for converting the DC voltage between terminals P1, N1 (to be described later) into an AC voltage having a rectangular waveform. As shown in FIG. 1, the first circuit 1 includes six first switching elements Q11-Q16, which are bridge-connected together. In addition, the first circuit 1 further includes two first internal terminals 111, 112 and three first external terminals 113-115.

Each of the first switching elements Q11-Q16 may be, for example, a depletion mode n-channel metal-oxide semiconductor field effect transistor (MOSFET). The first switching element Q11 having the higher potential is electrically connected in series to the first switching element Q12 having the lower potential between the terminals P1 and N1. The first switching element Q13 having the higher potential is electrically connected in series to the first switching element Q14 having the lower potential between the terminals P1 and N1. The first switching element Q15 having the higher potential is electrically connected in series to the first switching element Q16 having the lower potential between the terminals P1 and N1. That is to say, between the terminals P1, N1, a series circuit of the first switching elements Q11, Q12, a series circuit of the first switching elements Q13, Q14, and a series circuit of the first switching elements Q15, Q16 are electrically connected in parallel with each other.

Each of the first switching elements Q11-Q16 includes a parasitic diode. The parasitic diode of each of the first switching elements Q11-Q16 has its anode electrically connected to the source of an associated one of the first switching elements Q11-Q16 and has its cathode electrically connected to the drain of the associated one of the first switching elements Q11-Q16.

Each of the first switching elements Q11, Q13, Q15 having the higher potential has its drain electrically connected to the terminal P1 via the first internal terminal 111. Each of the first switching elements Q12, Q14, Q16 having the lower potential has its source electrically connected to the terminal N1 via the first internal terminal 112. Also, the first switching element Q11 having the higher potential has its source electrically connected to the drain of the first switching element Q12 having the lower potential. Likewise, the first switching element Q13 having the higher potential has its source electrically connected to the drain of the first switching element Q14 having the lower potential. Likewise, the first switching element Q15 having the higher potential has its source electrically connected to the drain of the first switching element Q16 having the lower potential.

The first switching elements Q11-Q16 turn ON and OFF in response to first drive signals Sig5-Sig10, respectively, supplied from the control circuit 6.

(2.2) Second Circuit

The second circuit 2 may be, for example, a DC/DC converter. Specifically, the second circuit 2 may be a step-up chopper circuit for boosting the DC voltage supplied from the solar battery 70. As shown in FIG. 1, the second circuit 2 includes a capacitor C2, an inductor L1, and two switching elements Q21, Q22. In addition, the second circuit 2 further includes two second internal terminals 211, 212 and two second external terminals 213, 214.

The capacitor C2 is electrically connected between the two first DC terminals T11, T12 via the two second external terminals 213, 214. In other words, the capacitor C2 is connected to the solar battery 70 via the two second external terminals 213, 214 and the two first DC terminals T11, T12. The capacitor C2 may be, for example, an electrolytic capacitor. The capacitor C2 has the capability of stabilizing the voltage between the first DC terminals T11, T12. Alternatively, the capacitor C2 does not have to be one of the constituent elements of the second circuit 2.

Each of the second switching elements Q21, Q22 may be, for example, a depletion mode n-channel MOSFET. The second switching element Q21 having the higher potential is electrically connected in series to the second switching element Q22 having the lower potential between the terminals P1, N1. That is to say, a series circuit of the second switching elements Q21, Q22 is electrically connected between the terminals P1, N1.

Each of the second switching elements Q21, Q22 includes a parasitic diode. The parasitic diode of each of the second switching elements Q21, Q22 has its anode electrically connected to the source of an associated one of the second switching elements Q21, Q22 and has its cathode electrically connected to the drain of the associated one of the second switching elements Q21, Q22.

The second switching element Q21 having the higher potential has its drain electrically connected to the terminal P1 via the second internal terminal 211. The second switching element Q22 having the lower potential has its source electrically connected to the terminal N1 via the second internal terminal 212. Also, the second switching element Q21 having the higher potential has its source electrically connected to the drain of the second switching element Q22 having the lower potential.

The second switching elements Q21, Q22 turn ON and OFF in response to second drive signals Sig11, Sig12, respectively, supplied from the control circuit 6.

A first terminal of the inductor L1 is electrically connected to the second external terminal 213. A second terminal of the inductor L1 is electrically connected to a node of connection between the second switching elements Q21, Q22.

(2.3) Third Circuit

The third circuit (virtual DC voltage generator circuit) 3 may be, for example, a DC/DC converter. As shown in FIG. 1, the third circuit 3 includes a capacitor C1, a transformer 33, and four third switching elements Q31-Q34. The third circuit 3 further includes two third internal terminals 341, 342 and two third external terminals 343, 344.

The capacitor C1 is electrically connected between the two second DC terminals T21, T22 via the two third external terminals 343, 344. In other words, the capacitor C1 is connected to the storage battery 80 via the two third external terminals 343, 344 and the two second DC terminals T21, T22. The capacitor C1 may be, for example, an electrolytic capacitor. The capacitor C1 has the capability of stabilizing the voltage between the second DC terminals T21, T22. Alternatively, the capacitor C1 does not have to be one of the constituent elements of the third circuit 3.

Each of the third switching elements Q31-Q34 may be, for example, a depletion mode n-channel MOSFET. Each of the third switching elements Q31-Q34 includes a parasitic diode. The parasitic diode of each of the third switching elements Q31-Q34 has its anode electrically connected to the source of an associated one of the third switching elements Q31-Q34 and has its cathode electrically connected to the drain of the associated one of the third switching elements Q31-Q34.

The third switching elements Q31-Q34 turn ON and OFF in response to the third drive signals Sig1-Sig4, respectively, supplied from the control circuit 6. Note that in the following description, when there is no need, in particular, to distinguish the first drive signals Sig5-Sig10, the second drive signals Sig11, Sig 12, and the third drive signals Sig1-Sig4 from each other, these drive signals will be hereinafter collectively referred to as "drive signals Sig1-Sig 12."

The transformer 33 includes a primary winding 331 and a secondary winding 332 which are magnetically coupled together. The primary winding 331 is electrically connected to the capacitor C1 via the third switching elements Q31, Q32. The secondary winding 332 is electrically connected between the third internal terminals 341, 342 via the third switching elements Q33, Q34.

The transformer 33 may be, for example, an RF insulated transformer with center taps. The primary winding 331 of the transformer 33 may be implemented as, for example, a series circuit of two windings L31, L32, of which the node of connection is a primary-side center tap CT1. In the same way, the secondary winding 332 of the transformer 33 may be implemented as, for example, a series circuit of two windings L33, L34, of which the node of connection is a secondary-side center tap CT2. That is to say, the two windings L31, L32 are electrically connected in series to form the primary winding 331. Likewise, the two windings L33, L34 are electrically connected in series to form the secondary winding 332. The primary-side center tap CT1 is electrically connected to a positive electrode terminal (i.e., located closer to the second DC terminal T21) of the capacitor C1. The secondary-side center tap CT2 is electrically connected to one third internal terminal 341. The turns ratio of the windings L31, L32, L33, L34 may be, for example, 1:1:1:1. The turns ratio of the windings L31, L32, L33, L34 may be changed arbitrarily according to the specification of the power conversion system 10, for example. In the following description, a circuit including the third switching elements Q31, Q32 and the primary winding 331 of the transformer 33 will be hereinafter referred to as a "primary-side circuit 31" and a circuit including the third switching elements Q33, Q34 and the secondary winding 332 of the transformer 33 will be hereinafter referred to as a "secondary-side circuit 32."

The third circuit 3 receives, via the second DC terminals T21, T22, the voltage across the storage battery 80 as an input voltage.

In the third circuit 3, the third switching elements Q31, Q32 of the primary-side circuit 31 turn ON and OFF, thereby converting the input voltage into a radio-frequency AC voltage having a rectangular waveform of 20 kHz, for example, and applying (supplying) the AC voltage to the primary winding 331 (including the windings L31, L32).

The third switching element Q31 is electrically connected in series to the winding L31 across the capacitor C1. The third switching element Q32 is electrically connected in series to the winding L32 across the capacitor C1. In other words, a series circuit of the third switching element Q31 and the winding L31 and a series circuit of the third switching element Q32 and the winding L32 are electrically connected in parallel between the second DC terminals T21, T22.

The third switching element Q31 has its drain electrically connected to the primary-side center tap CT1 via the winding L31. The third switching element Q32 has its drain electrically connected to the primary-side center tap CT1 via the winding L32. The third switching elements Q31, Q32 have their source electrically connected to the second DC terminal T22 having the low potential (i.e., on the negative electrode side).

In the third circuit 3, the third switching elements Q33, Q34 of the secondary-side circuit 32 turn ON and OFF, thereby converting an AC voltage having positive and negative polarities and a rectangular waveform and generated on the secondary winding 332 (including the windings L33, L34) into a DC voltage having positive polarity and outputting the DC voltage between the two terminals P1, N1 of the connection unit 7. In this case, the voltage is supplied between the terminals P1, N1 such that the terminal P1 has the higher potential (positive electrode) and the terminal N1 has the lower potential (negative electrode) out of the two terminals P1, N1.

The third switching element Q33 is electrically connected in series to the winding L33 between the terminals P1, N1. The third switching element Q34 is electrically connected in series to the winding L34 between the terminals P1, N1. That is to say, a series circuit of the third switching element Q33 and the winding L33 and a series circuit of the third switching element Q34 and the winding L34 are electrically connected in parallel between the terminals P1, N1.

The third switching element Q33 has its drain electrically connected to the secondary-side center tap CT2 via the winding L33. The third switching element Q34 has its drain electrically connected to the secondary-side center tap CT2 via the winding L34. The third switching elements Q33, Q34 have their source electrically connected to the terminal N1 having the lower potential (i.e., on the negative electrode side).

Optionally, a capacitor may be electrically connected between the drain and source of each of the third switching elements Q31, Q32. In that case, the capacitor produces resonance with the primary winding 331, thereby making soft switching of the third switching elements Q31-Q34. Alternatively, the capacitor may be electrically connected between the respective drains of the third switching elements Q31, Q32 or may also be electrically connected to each of the windings L31, L32 in parallel.

(2.4) Filter Circuit

The filter circuit 4 smooths out an AC voltage having a rectangular waveform and supplied from the first circuit 1. Thus, the AC voltage having the rectangular waveform and supplied from the first circuit 1 is converted into an AC voltage having a sinusoidal waveform and an amplitude corresponding to its pulse width.

Specifically, the filter circuit 4 includes a plurality of (e.g., three in the example illustrated in FIG. 1) inductors L41, L42, L43 and a plurality of (e.g., three in the example illustrated in FIG. 1) capacitors C41, C42, C43. The inductor L41 has its first terminal electrically connected to the node of connection between the first switching elements Q11, Q12 via the first external terminal 113 and has its second terminal electrically connected to the AC terminal T31. The inductor L42 has its first terminal electrically connected to the node of connection between the first switching elements Q13, Q14 via the first external terminal 114 and has its second terminal electrically connected to the AC terminal T32. The inductor L43 has its first terminal electrically connected to the node of connection between the first switching elements Q15, Q16 via the first external terminal 115 and has its second terminal electrically connected to the AC terminal T33. The capacitor C41 is electrically connected between the AC terminals T31, T32. The capacitor C42 is electrically connected between the AC terminals T32, T33. The capacitor C43 is electrically connected between the AC terminals T31, T33.

In other words, the node of connection between the first switching elements Q11, Q12 is electrically connected to the AC terminal T31 corresponding to the U-phase via the inductor L41. The node of connection between the first switching elements Q13, Q14 is electrically connected to the AC terminal T32 corresponding to the V-phase via the inductor L42. The node of connection between the first switching elements Q15, Q16 is electrically connected to the AC terminal T33 corresponding to the W-phase via the inductor L43.

(2.5) Snubber Circuit

The snubber circuit 5 is electrically connected to the terminals P1, N1. That is to say, the snubber circuit 5 is electrically connected to the transformer 33 of the third circuit 3.

The snubber circuit 5 is a regenerative snubber circuit for absorbing electrical energy from the terminals P1, N1 of the connection unit 7 and injecting (regenerating) electrical energy into the terminals P1, N1. If a bus voltage Vbus between the terminals P1, N1 exceeds a first clamp value Vclp1 (see FIG. 2), the snubber circuit 5 absorbs part of the electrical energy in excess of the first clamp value Vclp1 through the terminals P1, N1, thereby clamping an upper limit value of the bus voltage Vbus at the first clamp value Vclp1. Also, if the bus voltage Vbus becomes lower than a second clamp value Vclp2 (<Vclp1), the snubber circuit 5 injects (regenerates) the electrical energy into the terminals P1, N1, thereby clamping the lower limit value of the bus voltage Vbus at the second clamp value Vclp2.

The snubber circuit 5 includes a plurality of (e.g., two in the example illustrated in FIG. 1) diodes D1, D2, a resistor R1, and a plurality of (e.g., two in the example illustrated in FIG. 1) capacitors C51, C52 as shown in FIG. 1. The diode D1 is electrically connected in series to the capacitor C51 between the terminals P1, N1. The diode D2 is electrically connected in series to the capacitor C52 between the terminals P1, N1. The diode D1 has its anode electrically connected to the terminal P1 and has its cathode electrically connected to the terminal N1 via the capacitor CM. The diode D2 has its anode electrically connected to the terminal N1 via the capacitor C52 and has its cathode electrically connected to the terminal P1. That is to say, the diodes D1 and D2 are connected in mutually opposite directions between the terminals P1, N1. The resistor R1 is electrically connected between the node of connection of the diode D1 and the capacitor C51 and the node of connection of the diode D2 and the capacitor C52.

In the snubber circuit 5, when the bus voltage Vbus exceeds the first clamp value Vclp1, the electrical energy absorbed from the terminals P1, N1 is stored in the capacitor C51. The electrical energy stored in the capacitor C51 is transmitted to the capacitor C52 via the resistor R1. If the bus voltage Vbus is lower than the second clamp value Vclp2, the electrical energy stored in the capacitor C52 is regenerated at the terminals P1, N1 via the diode D2.

(2.6) Control Circuit

The control circuit 6 is implemented as, for example, a microcomputer including a processor and a memory. That is to say, the control circuit 6 is implemented as a computer system including a processor and a memory. The computer system performs the function of the control circuit 6 by making the processor execute an appropriate program. The program may be stored in advance in the memory. Alternatively, the program may also be downloaded via a telecommunications line such as the Internet or distributed after having been stored in a non-transitory storage medium such as a memory card.

The control circuit 6 is configured to control each of the first circuit 1, the second circuit 2, and the third circuit 3. The control circuit 6 outputs the first drive signals Sig5-Sig10 for driving the first switching elements Q11-Q16, respectively, to the first circuit 1. The control circuit 6 outputs the second drive signals Sig11, Sig12 for driving the second switching elements Q21, Q22, respectively, to the second circuit 2. The control circuit 6 outputs the third drive signals Sig1-Sig4 for driving the third switching elements Q31-Q34, respectively, to the third circuit 3. Each of the drive signals Sig1-Sig12 is a PWM signal, which is a binary signal that switches between high level (an exemplary active value) and low level (an exemplary inactive value).

(2.7) Connection Unit

To the connection unit 7, the first circuit 1 is electrically connected via the first internal terminals 111, 112 as shown in FIG. 1. In addition, to the connection unit 7, the second circuit 2 is also electrically connected via the second internal terminals 211, 212. Furthermore, to the connection unit 7, the third circuit 3 is also electrically connected via the third internal terminals 341, 342. In other words, the first internal terminals 111, 112 of the first circuit 1, the second internal terminals 211, 212 of the second circuit 2, and the third internal terminals 341, 342 of the third circuit 3 are all electrically connected to the same connection unit 7. That is to say, in the power conversion system 10 according to this embodiment, the first circuit 1, the second circuit 2, and the third circuit 3 are electrically connected together on the DC side.

The connection unit 7 includes the terminals P1, N1 as shown in FIG. 1. In addition, the secondary-side circuit 32 of the third circuit 3 operates to make the voltage at the terminal P1 positive with respect to the terminal N1 (i.e., to allow the terminal P1 to have a higher potential than the terminal N1). To the connection unit 7, electrically connected is the snubber circuit 5 described above.

(3) Operation (3.1) Operation of Power Conversion System

Next, it will be described with reference to FIGS. 2-4 how the power conversion system 10 according to this embodiment operates.

The power conversion system 10 according to this embodiment converts (transmits) power bidirectionally between the first DC terminals T11, T12 and the second DC terminals T21, T22 and the AC terminals T31, T32, T33. That is to say, the power conversion system 10 has an inverter mode and a converter mode as two operation modes thereof. As used herein, the inverter mode refers to a mode in which the DC power supplied to the first DC terminals T11, T12 and the second DC terminals T21, T22 is converted into three-phase AC power, which is then output through the AC terminals T31, T32, T33. The converter mode herein refers to a mode in which the three-phase AC power supplied to the AC terminals T31, T32, T33 is converted into DC power, which is then output through the second DC terminals T21, T22.

In other words, the inverter mode herein refers to a mode in which between the AC terminals T31, T32, T33, a voltage drop is caused in the same direction as the direction in which a current flows through the power grid 90, i.e., a mode in which a voltage and a current of the same polarity are generated. On the other hand, the converter mode herein refers to a mode in which between the AC terminals T31, T32, T33, a voltage drop is caused in the opposite direction from the direction in which a current flows through the power grid 90, i.e., a mode in which a voltage and a current of opposite polarities are generated.

In the following description, a situation where the power conversion system 10 operates in the inverter mode to convert DC power into three-phase AC power with a frequency of 50 Hz or 60 Hz will be described as an example. Also, in the following description, a situation where the second switching elements Q21, Q22 have a drive frequency of 40 kHz and the third switching elements Q31-Q34 have a drive frequency of 20 kHz will be described as an example.

Figure 2:
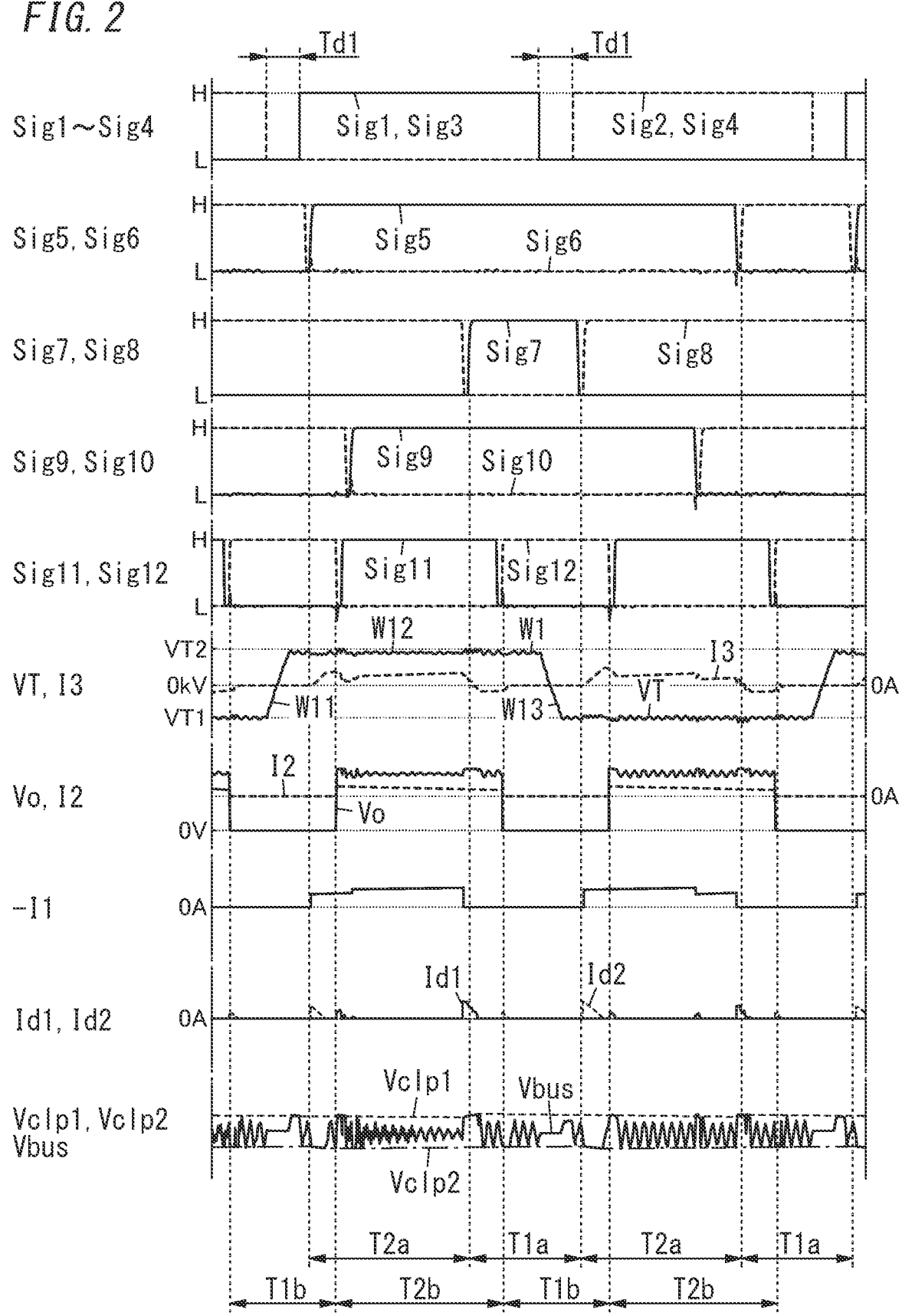
FIG. 2 is a waveform chart showing how the power conversion system may operate in an inverter mode.

FIG. 2 is a waveform chart showing how the power conversion system 10 according to this embodiment operates in the inverter mode. In FIG. 2, the abscissa indicates the time. Also, in FIG. 2, the respective waveforms of the third drive signals Sig1-Sig4, the first drive signals Sig5, Sig6, the first drive signals Sig7, Sig8, the first drive signals Sig9, Sig10, and the second drive signals Sig11, Sig12 are shown from top to bottom in this order. In addition, in FIG. 2, the output voltage VT and a third output current I3, a voltage Vo across the second switching element Q22 and a second output current I2, a first output current IL currents Id1, Id2 flowing through the diodes D1, D2, a bus voltage Vbus, and a first clamp value Vclp1 and a second clamp value Vclp2 are also shown.

As for the drive signals Sig1-Sig12, their high level is denoted by "H" and their low level is denoted by "L" in FIG. 2. Each of the first switching elements Q11-Q16, the second switching elements Q21, Q22, and the switching elements Q31-Q34 turns ON when its associated drive signal Sig1-Sig12 is high and turns OFF when its associated drive signal Sig1-Sig12 is low.

Also, the output voltage VT is a voltage generated across the secondary winding 332. The third output current I3 is a current flowing from the secondary-side center tap CT2 toward the terminal P1. Furthermore, the voltage Vo is the voltage across the second switching element Q22. The second output current I2 is a current flowing through the second switching element Q21 toward the terminal P1. The first output current I1 is a current flowing from the first circuit 1 toward the terminal P1. In the inverter mode, the first output current I1 flows from the terminal P1 toward the first circuit 1, and therefore, is designated by "−I1."

The control circuit 6 controls the second circuit 2 such that the second switching elements Q21, Q22 thereof alternately turn ON and OFF. While the second switching element Q21 is ON and the second switching element Q22 is OFF, a voltage with positive polarity is applied (supplied) to the terminals P1, N1. On the other hand, while the second switching element Q21 is OFF and the second switching element Q22 is ON, the electrical energy generated by the solar battery 70 is stored in the inductor L1 via the second switching element Q22.

The control circuit 6 controls the third switching elements Q31, Q32 of the third circuit 3 such that a positive voltage and a negative voltage are alternately applied to the primary winding 331. In addition, the control circuit 6 also controls the third switching elements Q33, Q34 to make the voltage at the terminal P1 positive with respect to the terminal N1.

Specifically, the control circuit 6 turns the third switching elements Q32, Q34 OFF while the third switching elements Q31, Q33 are ON. The control circuit 6 turns the third switching elements Q32, Q34 ON while the third switching elements Q31, Q33 are OFF. In this case, the control circuit 6 controls the third switching elements Q31-Q34 at the same duty cycle. In this embodiment, the duty cycle of the third switching elements Q31-Q34 is set at 0.5 (substantially 50%).

In addition, the control circuit 6 controls the third switching elements Q31, Q32 such that a radio frequency AC voltage is supplied to the primary winding 331 and the secondary winding 332 and also controls the third switching elements Q33, Q34 such that a voltage with positive polarity is supplied to the terminals P1, N1.

The control circuit 6 controls, with respect to the first circuit 1, the amplitude or phase of at least one of a voltage or a current output through the AC terminals T31, T32, T33 by turning each of the first switching elements Q11-Q16 ON or OFF.

The control circuit 6 controls the first circuit 1 such that in a period T1a including an inversion period Td1 in which the polarity of the voltage applied to the primary winding 331 inverts, no power is transmitted between the first circuit 1 and the third circuit 3. In addition, the control circuit 6 also controls the second circuit 2 such that in a period T1b including the inversion period Td1, no power is transmitted between the second circuit 2 and the third circuit 3. Furthermore, the control circuit 6 further controls the first circuit 1 such that in a period T2a different from the period T1a, power is transmitted between the first circuit 1 and the third circuit 3. Likewise, the control circuit 6 further controls the second circuit 2 such that in a period T2b different from the period T1b, power is transmitted between the second circuit 2 and the third circuit 3.

Specifically, the control circuit 6 operates to repeatedly go through the series of first through fifth modes to be described below.

In the first mode, the control circuit 6 outputs the first drive signals Sig5-Sig10 to the first circuit 1 such that the first switching elements Q11, Q13, Q15 having the higher potential turn ON or the first switching elements Q12, Q14, Q16 having the lower potential turn ON. This changes the operation mode into a first circulation mode in which a current circulates in the first circuit 1 (hereinafter referred to as a "first circulation period").

In the second mode, the control circuit 6 outputs the second drive signals Sig11, Sig12 to the second circuit 2 such that the second switching element Q21 having the higher potential turns OFF and the second switching element Q22 having the lower potential turns ON with the first circuit 1 allowed to operate in the first mode. This changes the operation mode into a second circulation mode in which a current circulates in the second circuit 2 (hereinafter referred to as a "second circulation period"). Optionally, the first mode and the second mode may appear in reverse order.

In the third mode, the control circuit 6 outputs the third drive signals Sig1-Sig4 to the third circuit 3 such that the four third switching elements Q31-Q34 turn OFF with the first circuit 1 allowed to operate in the first mode and the second circuit 2 allowed to operate in the second mode. At this time, the output voltage VT rises or falls with an excitation current generated by the transformer 33 (see FIG. 2). In addition, since the first output current I1 has gone zero in this case, the third switching elements Q31-Q34 may make zero-current switching (soft switching) that allows switching to be always made with stability irrespective of the load current (which corresponds to the inversion period).

In the fourth mode, the control circuit 6 outputs the third drive signals Sig1-Sig4 to the third circuit 3 such that the third switching elements Q31, Q33 turn ON or the third switching elements Q32, Q34 turn ON. Thus, a voltage with positive polarity is applied (or supplied) between the terminals P1, N1. Also, in the fourth mode, the control circuit 6 outputs the first drive signals Sig5-Sig10 to the first circuit 1 such that the first switching element Q11 having the higher potential turns ON and the first switching elements Q14, Q16 having the lower potential turn ON or that the first switching elements Q11, Q15 having the higher potential turn ON and the first switching element Q14 having the lower potential turns ON. In this manner, power is transmitted between the first circuit 1 and the third circuit 3 (which corresponds to a transmission period). Although the (ON/OFF) states of the respective switching elements are described with reference to the example illustrated in FIG. 2, the (ON/OFF) states of the third switching elements Q31-Q34 shown in FIG. 2 should not be construed as limiting but may be modified in various manners, as long as an exclusive relationship is satisfied between the first circuit 1 and the first mode.

In the fifth mode, the control circuit 6 outputs the third drive signals Sig1-Sig4 to the third circuit 3 such that the third switching elements Q31, Q33 turn ON or the third switching elements Q32, Q34 turn ON. Thus, a voltage with positive polarity is applied (or supplied) between the terminals P1, N1. Also, in the fourth mode, the control circuit 6 outputs the second drive signals Sig11, Sig 12 to the second circuit 2 such that the second switching element Q21 having the higher potential turns ON and the second switching element Q22 having the lower potential turn OFF. In this manner, power is converted between the second circuit 2 and the third circuit 3 (which corresponds to the transmission period). Optionally, the fourth mode and the fifth mode may appear in reverse order.

The first circuit 1 goes through the first mode and the fourth mode repeatedly and the second circuit 2 goes through the second mode and the fifth mode repeatedly. The third circuit 3 operates in the third mode while the first circuit 1 is operating in the first mode and the second circuit 2 is operating in the second mode.

In this case, the inversion period Td1 in which all of the four third switching elements Q31-Q34 of the third circuit 3 turn OFF needs to be in synch with the first mode of the first circuit 1. Thus, the first circuit 1 needs to be synchronized with the carrier for the third circuit 3. In addition, the inversion period Td1 in which all of the four third switching elements Q31-Q34 of the third circuit 3 turn OFF needs to be in synch with the second mode of the second circuit 2. Thus, the second circuit 2 needs to be synchronized at a frequency which is twice as high as that of the carrier for the third circuit 3. In other words, synchronizing the carrier for the third circuit 3 with the carrier for the first circuit 1 and the second circuit 2 may have the inversion period Td1 in which all of the four third switching elements Q31-Q34 of the third circuit 3 turn OFF synchronized with the first mode and the second mode.

The waveform W1 of the output voltage VT generated across the secondary winding 332 of the transformer 33 of the third circuit 3 has a rectangular waveform as shown in FIG. 2. Specifically, the waveform W1 of the output voltage VT includes a rising range W11, a falling range W13, and a flat range W12. In the rising range W11, the output voltage VT increases proportionately (changes) from a first potential VT1 to a second potential VT2 (>VT1) higher than the first potential VT1 as shown in FIG. 2. In the falling range W13, the output voltage VT decreases proportionately (changes) from the second potential VT2 to the first potential VT1 as shown in FIG. 2. In the flat range W12, the output voltage VT is maintained at either the first potential VT1 or the second potential VT2 as shown in FIG. 2. Also, in the power conversion system 10 according to this embodiment, a DC voltage corresponding to the flat range W12 of the output voltage VT generated across the secondary winding 332 is applied (supplied) to the terminals P1, N1 of the connection unit 7. That is to say, the power conversion system 10 according to this embodiment allows a DC voltage corresponding to the flat range W12 of the output voltage VT to be generated in the connection unit 7, thus enabling the first circuit 1 and the second circuit 2 to be connected on the DC side.

In addition, on the path leading from the capacitor C1 of the third circuit 3 to the connection unit 7, no inductors (but the transformer 33) are suitably connected. For example, if the second switching element Q21 having the higher potential is ON and the second switching element Q22 having the lower potential is OFF in the second circuit 2, then the capacitor C2 with low impedance and the connection unit 7 are connected via the inductor L1, thus making the impedance relatively high. On the other hand, if the second switching element Q21 having the higher potential is OFF and the second switching element Q22 having the lower potential is ON in the second circuit 2, then the path leading from the capacitor C2 to the connection unit 7 is interrupted, thus making the impedance even higher. In such a situation, the load current could cause too significant a voltage variation in the connection unit 7 to make AC conversion.

In contrast, in the power conversion system 10 according to this embodiment, in a period in which any of the four third switching elements Q31-Q34 of the third circuit 3 is ON, the impedance between the terminals P1, N1 becomes equivalent to the low impedance of the capacitor C1. Consequently, the impedance between the terminals P1, N1 becomes low even with no smoothing capacitors used in the connection unit 7.

In this case, the third circuit 3 may be used as a voltage source only when the third circuit 3 has a low impedance. Thus, the third circuit 3 suitably has a low impedance. In other words, no inductors (but the transformer 33) are suitably connected on the path leading from the capacitor C1 of the third circuit 3 to the connection unit 7. Even so, a high impedance could be caused at a frequency sufficiently higher than the carrier frequency (e.g., in the case of ringing). Nevertheless, the low impedance may still be maintained since the frequency component is removable by the snubber circuit 5.

Also, if the time ratio (which is the ratio of the ON period of a switching element to a cycle time thereof) is low, then the voltage utilization factor decreases, and therefore, the voltage value of the output voltage from the third circuit 3 to the connection unit 7 needs to be increased. Therefore, in a period in which any of the four third switching elements Q31-Q34 of the third circuit 3 is ON, the time ratio is suitably equal to or greater than 50%. The time ratio in that period is more suitably equal to or greater than 90%. The power conversion system 10 according to this embodiment may increase the time ratio to 50% or more by shortening the inversion period Td1 of the transformer 33 of the third circuit 3.

In the example shown in FIG. 2, there is a time lag, for example, between the timing to turn the first switching element Q11 ON and the timing to turn the second switching element Q21 ON. Thus, when the second switching element Q21 is turned ON, the rate of change (dI3/dt) of the third output current I3 increases. In addition, in the example shown in FIG. 2, there is a time lag, for example, between the timing to turn the first switching element Q13 ON and the timing to turn the second switching element Q22 ON. Thus, when the second switching element Q22 is turned ON, the rate of change of the third output current I3 also increases. Also, as the third output current I3 changes more significantly, the ringing voltage caused by the leakage inductance of the transformer 33 also increases. Thus, to reduce the ringing voltage, the magnitude of change in the third output current I3 is suitably decreased. Specifically, to decrease the magnitude of change in the third output current I3, either the timing to turn the first switching elements Q11-Q16 ON or the timing to turn the first switching elements Q11-Q16 OFF is suitably brought into agreement with (i.e., synchronized with) either the timing to turn the second switching elements Q21, Q22 ON or the timing to turn the second switching elements Q21, Q22 OFF.

Figure 3:
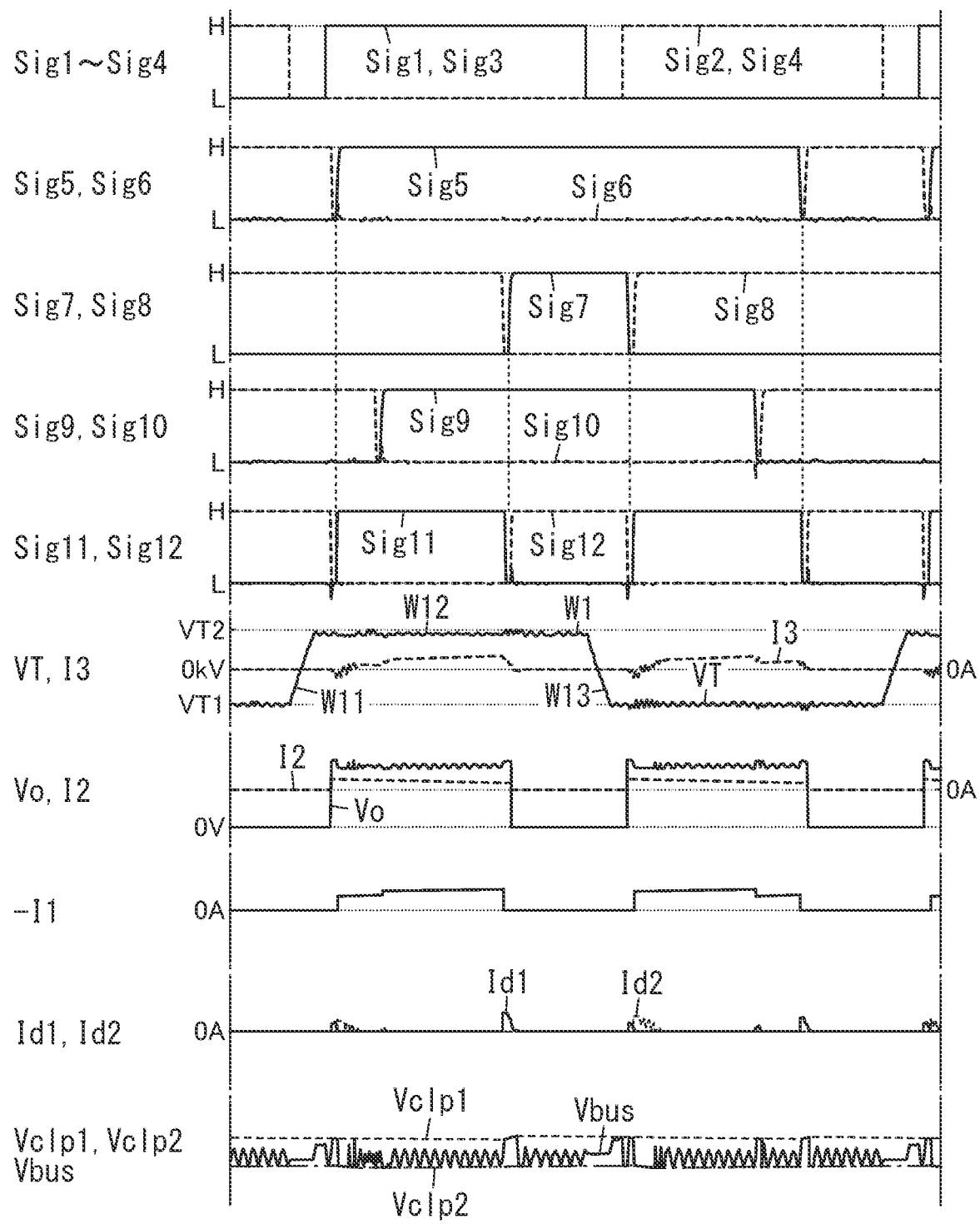
FIG. 3 is a waveform chart showing how the power conversion system may also operate in the inverter mode.

In the example shown in FIG. 3, the respective timings to turn the first switching element Q11 and the second switching element Q21 ON are synchronized with each other. Furthermore, in the example shown in FIG. 3, the respective timings to turn the first switching element Q13 and the second switching element Q22 ON are also synchronized with each other. Furthermore, in the example shown in FIG. 3, the respective timings to turn the first switching element Q14 and the second switching element Q21 ON are synchronized with each other. Furthermore, in the example shown in FIG. 3, the respective timings to turn the first switching element Q12 and the second switching element Q22 ON are synchronized with each other. This allows decreasing the magnitude of change caused in the third output current I3 at each of these timings, thus enabling reducing the effective value of the third output current I3 as well. In addition, reducing the magnitude of change in the third output current I3 enables lowering the ringing voltage as well. Furthermore, as the ringing voltage is lowered, the first clamp value Vclp1 and the second clamp value Vclp2 of the snubber circuit 5 decrease as well (see FIGS. 2 and 3).

In addition, compared to FIG. 2, the amounts of currents Id1, Id2 flowing through the diodes D1, D2 of the snubber circuit 5 also decrease, thus causing a decrease in the incoming power of the snubber circuit 5. Consequently, the output power of the snubber circuit 5 decreases, thus enabling the energy to cause ringing to be reduced as well.

In the example shown in FIG. 3, the respective timings to turn the first switching element Q11 and the second switching element Q21 ON are synchronized with each other, the respective timings to turn the first switching element Q13 and the second switching element Q22 ON are also synchronized with each other, the respective timings to turn the first switching element Q14 and the second switching element Q21 ON are also synchronized with each other, and the respective timings to turn the first switching element Q12 and the second switching element Q22 ON are also synchronized with each other. However, since I3=−I1−I2, d(I1+I2)/dt needs to be reduced to decrease dI3/dt. Thus, to reduce d(I1+I2)/dt, either the timing to turn ON, or the timing to turn OFF, at least one of the first switching elements Q11-Q16 of the first circuit 1 and either the timing to turn ON, or the timing to turn OFF, at least one of the second switching elements Q21, Q22 of the second circuit 2 need to be synchronized with each other. For example, the timing to turn OFF at least one of the first switching elements Q11-Q16 and the timing to turn OFF at least one of the second switching elements Q21, Q22 may be synchronized with each other. Alternatively, the timing to turn ON at least one of the first switching elements Q11-Q16 and the timing to turn OFF at least one of the second switching elements Q21, Q22 may be synchronized with each other, or vice versa.

Figure 4:
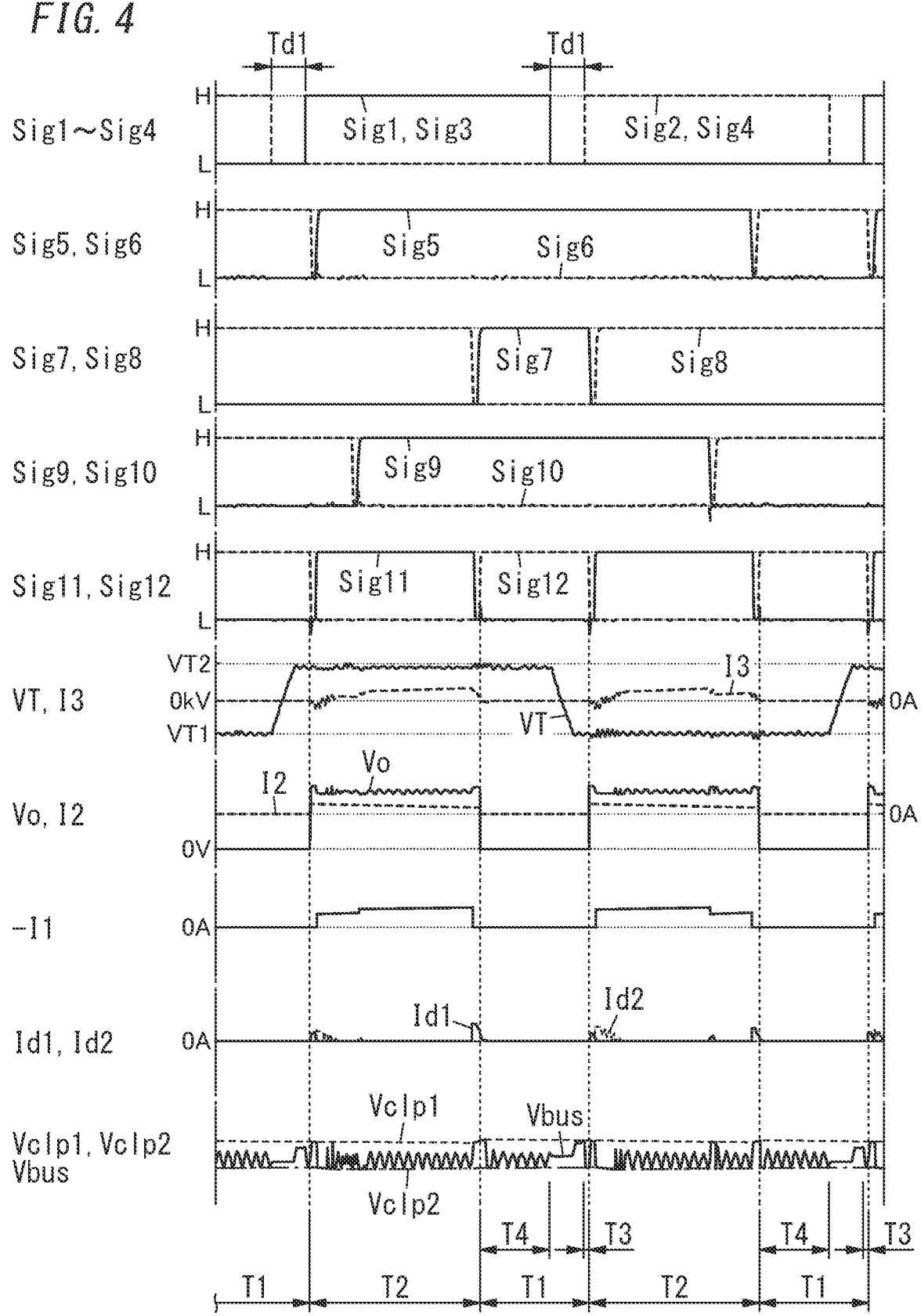
FIG. 4 shows the waveform chart of FIG. 3 with first and second periods specified.

The control circuit 6 controls the first circuit 1 such that no power is transmitted between the first circuit 1 and the third circuit 3, and also controls the second circuit 2 such that no power is transmitted between the second circuit 2 and the third circuit 3, in a first period T1 including the inversion period Td1 in which the voltage applied to the primary winding 331 of the transformer 33 inverts (see FIG. 4). In addition, the control circuit 6 controls the first circuit 1 such that power is transmitted between the first circuit 1 and the third circuit 3, and also controls the second circuit 2 such that power is transmitted between the second circuit 2 and the third circuit 3, in a second period T2 different from the first period T1 (see FIG. 4).

More specifically, in the power conversion system 10, the first period T1 and the second period T2 are assigned within a unit time corresponding to a half carrier of a PWM signal as shown in FIG. 4. In addition, the inversion period Td1 and the circulation period are assigned to the first period T1 and a supply period is assigned to the second period T2. Note that if the power conversion system 10 operates in the inverter mode, the supply period is assigned to the second period T2. On the other hand, if the power conversion system 10 operates in the converter mode, then a regeneration period is assigned to the second period T2.

Then, the control circuit 6 generates a target voltage or current by performing PWM control on the first circuit 1 to change the ratio of the second period T2 to each unit period (a half carrier). As used herein, the target voltage or current may be, for example, a voltage or current having the same waveform as a modulation signal for use in the PWM control.

As used herein, the first time length that is the length of a period T4 from the beginning of the first period T1 through the beginning of the inversion period Td1 is equal to or longer than the second time length that is the length of a period T3 from the end of the inversion period Td1 through the end of the first period T1. That is to say, comparing the respective time lengths of the periods T4 and T3 that are set within the first period T1 to respectively precede and follow the inversion period Td1, it can be seen that the time length of the period T4 preceding the inversion period Td1 is equal to or longer than the time length of the period T3 following the inversion period Td1. In the example illustrated in FIG. 4, the time length (first time length) of the period T4 is longer than the time length (second time length) of the period T3.

In this embodiment, in particular, even when at least the DC voltage applied to the second DC terminals T21, T22 is the maximum value within the rated operating range, the first time length (i.e., the time length of the period T4) is also equal to or longer than the second time length (i.e., the time length of the period T3).

Specifically, the voltage applied to the power grid 90 has a value defined by the specification, while the voltage of the storage battery 80 has a range with a certain width defined by the specification. For example, as the voltage of the storage battery 80 increases, the excitation current of the transformer 33 increases but the voltage utilization factor thereof decreases. That is to say, the extra time increases. Thus, even if an overcurrent that cannot be caused in a steady state is generated, making the first time length (i.e., the time length of the period T4) longer than the second time length (i.e., the time length of the period T3) enables allowing more time for the residual current to attenuate. This reduces the chances of the residual current (trailing current) falling upon the inversion period Td1, thus reducing the biased magnetization of the transformer 33. As used herein, the "residual current" refers to a current that is left due to the leakage inductance of the transformer 33 of the third circuit 3 even after the first circuit 1 and the second circuit 2 have been interrupted.

Conversely, if the voltage of the storage battery 80 is relatively low, then the voltage utilization factor increases and the extra time decreases. In that case, even if the first time length (i.e., the time length of the period T4) is made longer than the second time length (i.e., the time length of the period T3), the residual current may be allowed insufficient time to attenuate. In such a situation, the voltage of the transformer 33 may invert abruptly to possibly cause biased magnetization. In general, when biased magnetization arises, the excitation current of the transformer 33 increases, thus requiring an even better DC superposition characteristic. In this embodiment, if the voltage of the storage battery 80 is low, biased magnetization could arise. However, this rarely causes a problem because the excitation current is low in the first place.

In this case, the second time length (i.e., the time length of the period T3) is suitably set at a minimum required value and the first time length (i.e., the time length of the period T4) is suitably set at a maximum value falling within the allowable range.

Alternatively, the periods T3 and T4 may also be defined as follows. Specifically, while the power conversion system 10 is operating in the inverter mode, the period T4 may be defined as a period from the end of the second period T2 as the supply period through the beginning of the inversion period Td1 and the period T3 is defined as a period from the end of the inversion period Td1 through the beginning of the second period T2 as the supply period.

Likewise, while the power conversion system 10 is operating in the converter mode, the period T4 may be defined as a period from the end of the second period T2 as the regeneration period through the beginning of the inversion period Td1 and the period T3 is defined as a period from the end of the inversion period Td1 through the beginning of the second period T2 as the regeneration period.

The control circuit 6 suitably includes a detection unit for detecting an abnormality such as an overcurrent or overvoltage in each of the first circuit 1 and the second circuit 2. When the detection unit detects any abnormality in the first circuit 1 or the second circuit 2, the control circuit 6 suitably makes the timing to turn OFF at least one of the first switching elements Q11-Q16 or the second switching elements Q21, Q22 different from the timing to turn OFF the third switching elements Q31-Q34.

Specifically, when the detection unit detects an overcurrent or overvoltage in the first circuit 1, for example, the control circuit 6 turns the first switching elements Q11-Q16 OFF. At this time, the control circuit 6 may or may not turn OFF the second switching elements Q21, Q22 of the second circuit 2. In addition, at this time, the control circuit 6 continues performing the PWM control on the third switching elements Q31-Q34 of the third circuit 3.

In addition, when the detection unit detects an overcurrent or overvoltage in the second circuit 2, for example, the control circuit 6 turns the second switching elements Q21, Q22 OFF. At this time, the control circuit 6 may or may not turn OFF the first switching elements Q11-Q16 of the first circuit 1. In addition, at this time, the control circuit 6 continues performing the PWM control on the third switching elements Q31-Q34 of the third circuit 3.

Then, when a predetermined period of time passes since at least one of the first switching elements Q11-Q16 or the second switching elements Q21, Q22 have been turned OFF, the control circuit 6 turns OFF the third switching elements Q31-Q34.

This allows the regenerative energy supplied from either the first circuit 1 or the second circuit 2 to be regenerated in the capacitor C1, thus allowing the stress applied to the third switching elements Q31-Q34 to be reduced by the regenerative energy.

(3.2) Results of Simulations

Next, results of simulations of the power conversion system 10 according to this embodiment will be described with reference to FIGS. 5A-8C.

Figure 5A:
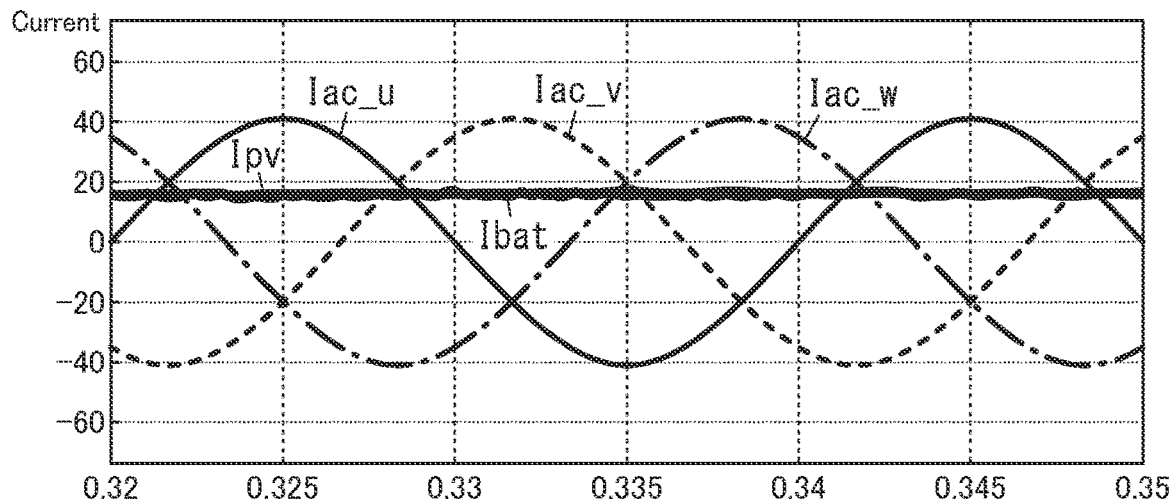
FIGS. 5A-5C is a set of waveform diagrams showing the results of simulations of the power conversion system.
Figure 5B:
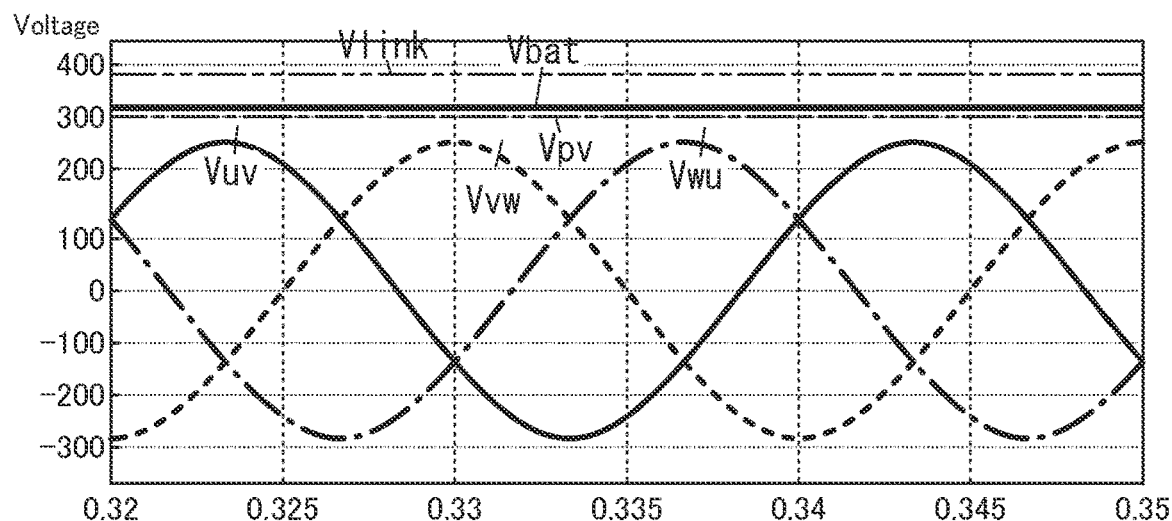
Figure 5C:
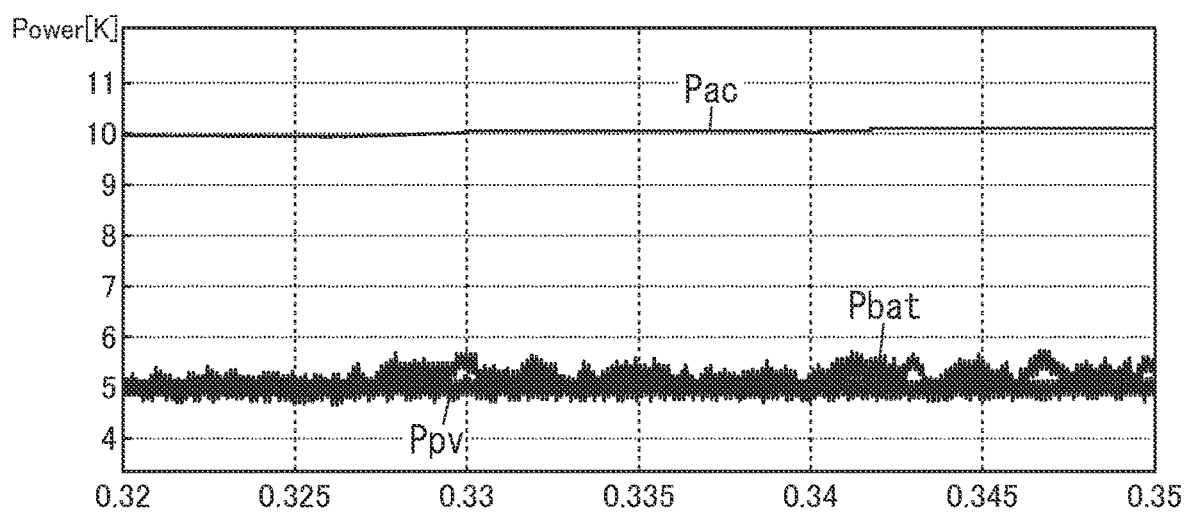

FIGS. 5A-5C show the results of simulations that were carried out with the output power of the second circuit 2 set at 5 kW the output power (discharge power) of the third circuit 3 set at 5 kW, and the output power (discharge power) of the first circuit 1 set at 10 kW. FIG. 5A shows the waveforms of currents, FIG. 5B shows the waveforms of voltages, and FIG. 5C shows the waveforms of powers. In this example, the voltage Vbat across the storage battery 80 was 320 V, the voltage Vpv across the solar battery 70 was 300 V, and the voltage Vlink between the terminals P1, N1 was 380 V. Also, the primary winding 331 and the secondary winding 332 of the transformer 33 had a turns ratio of 1:1.2. Note that the voltage Vlink between the terminals P1, N1 shown in FIG. 5B is an average value. According to the data shown in FIG. 5C, the output power (discharge power) of the first circuit 1 was 10 kW, the output power of the second circuit 2 was 5 kW, and the output power (discharge power) of the third circuit 3 was 5 kW. It can be seen that the power was transmitted as designed.

Figure 6A:
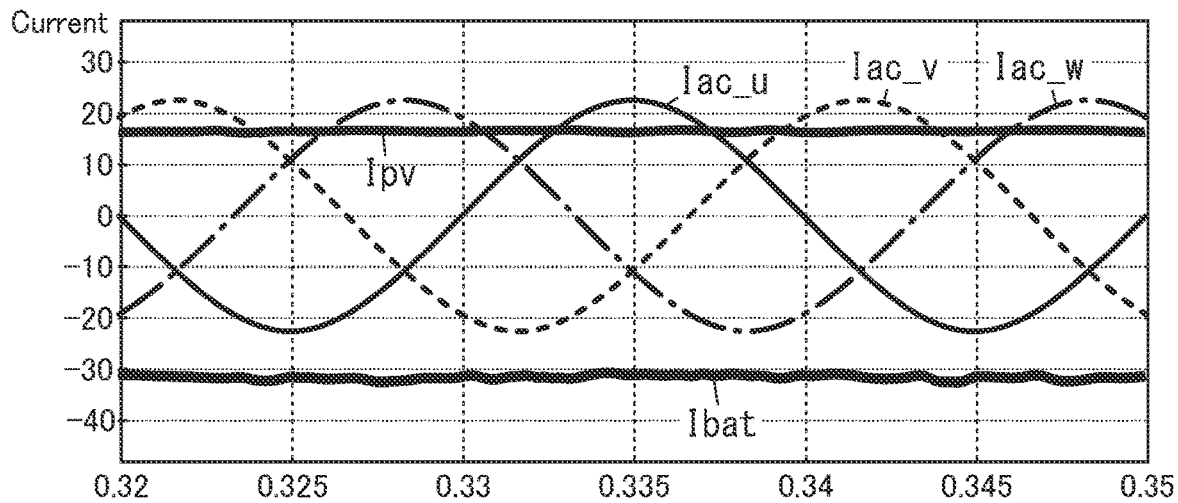
FIGS. 6A-6C is another set of waveform diagrams showing the results of simulations of the power conversion system.
Figure 6B:
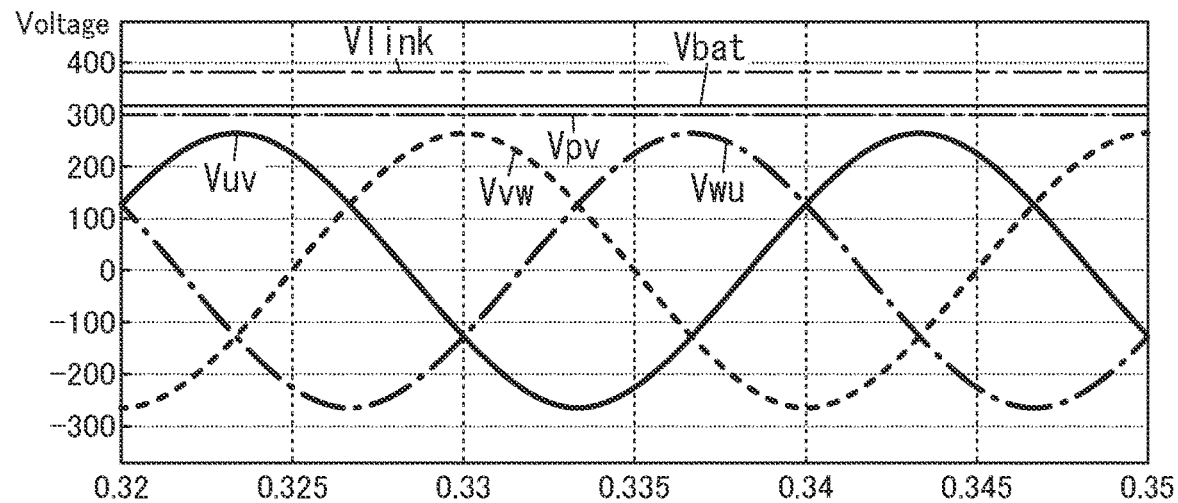
Figure 6C:
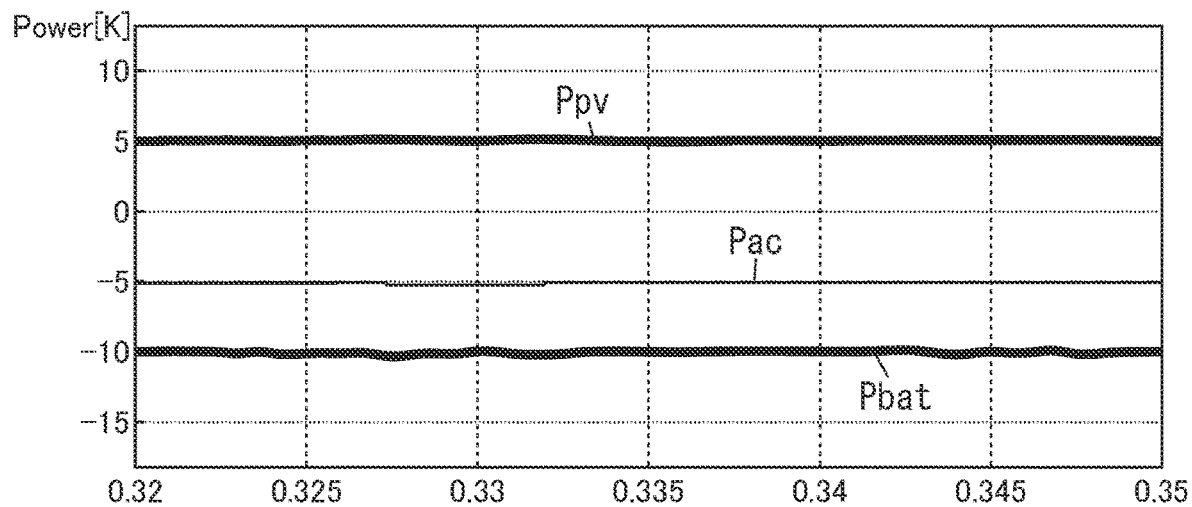

FIGS. 6A-6C show the results of simulations that were carried out with the output power of the second circuit 2 set at 5 kW, the output power (charge power) of the third circuit 3 set at −10 kW, and the output power (charge power) of the first circuit 1 set at −5 kW. FIG. 6A shows the waveforms of currents, FIG. 6B shows the waveforms of voltages, and FIG. 6C shows the waveforms of powers. In this example, the voltage Vbat across the storage battery 80 was 320 V, the voltage Vpv across the solar battery 70 was 300 V, and the voltage Vlink between the terminals P1, N1 was 380 V. Also, the primary winding 331 and the secondary winding 332 of the transformer 33 had a turns ratio of 1:1.2. Note that the voltage Vlink between the terminals P1, N1 shown in FIG. 6B is an average value. According to the data shown in FIG. 6C, the output power (charge power) of the first circuit 1 was −5 kW, the output power of the second circuit 2 was 5 kW, and the output power (charge power) of the third circuit 3 was −10 kW. It can be seen that the power was transmitted as designed.

Figure 7:
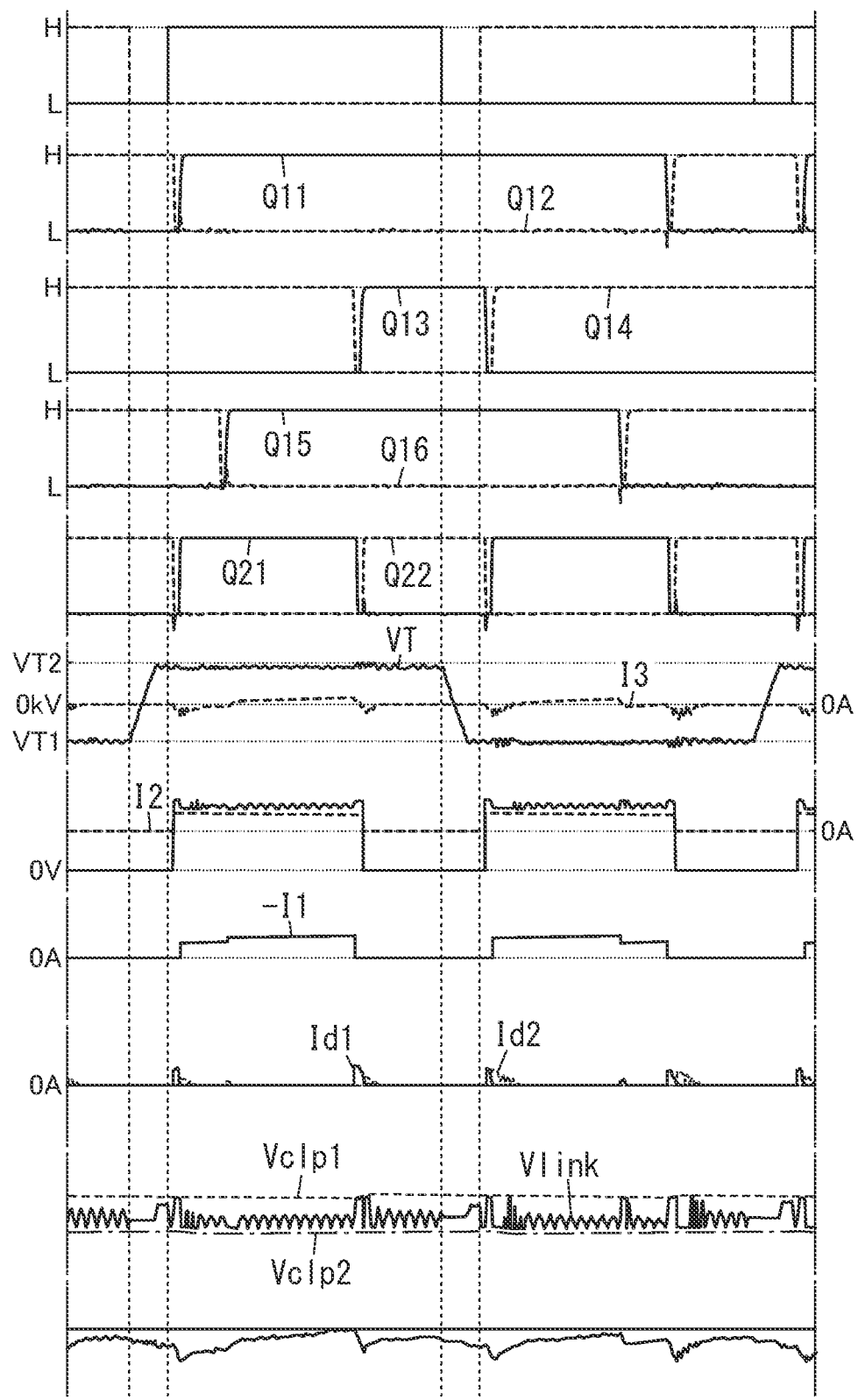
FIG. 7 is an enlarged waveform chart showing a part of the operation in the inverter mode of the power conversion system shown in FIGS. 8A-8C.
Figure 8A:
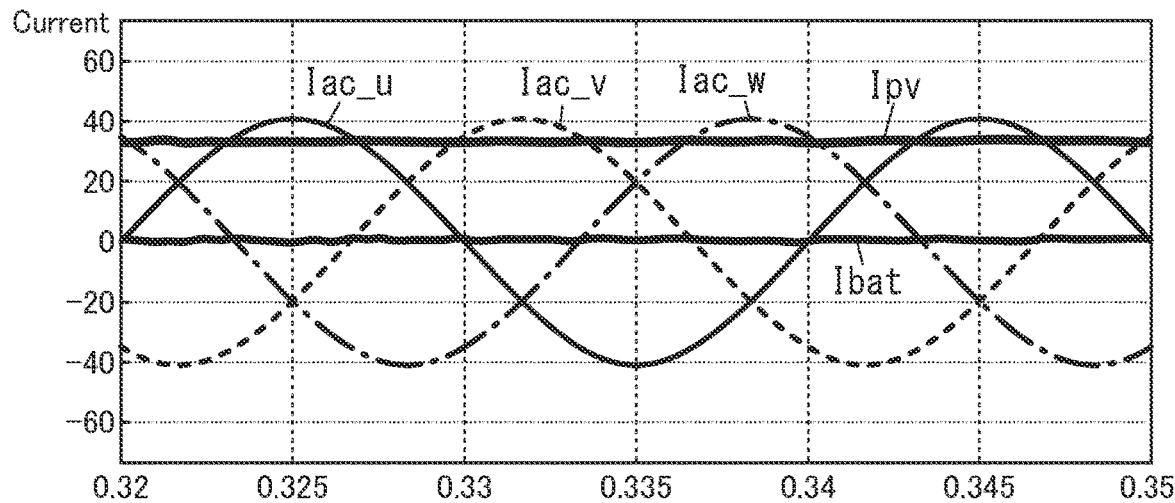
FIGS. 8A-8C is still another set of waveform diagrams showing the results of simulations of the power conversion system.
Figure 8B:
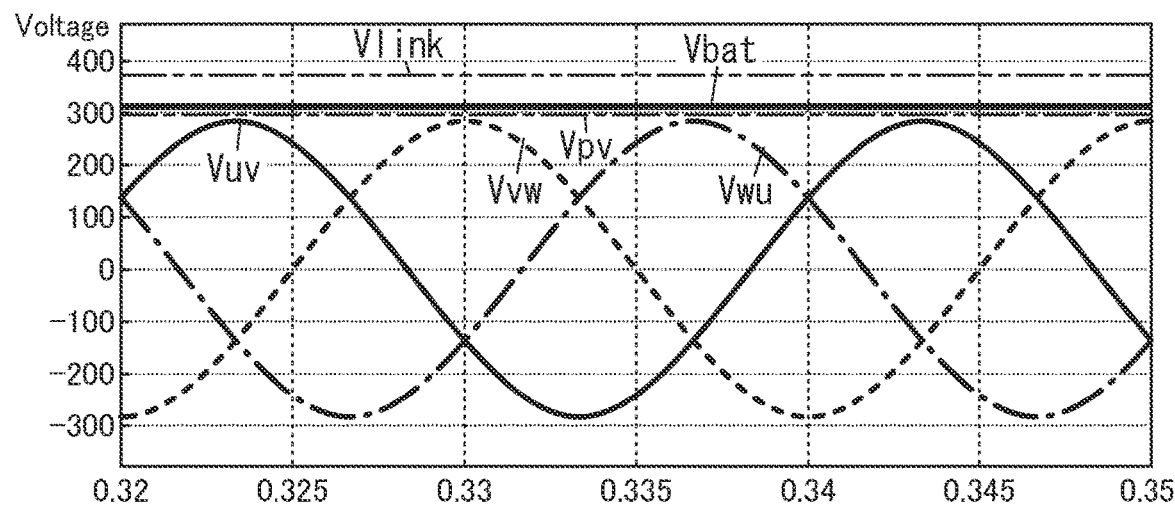
Figure 8C:
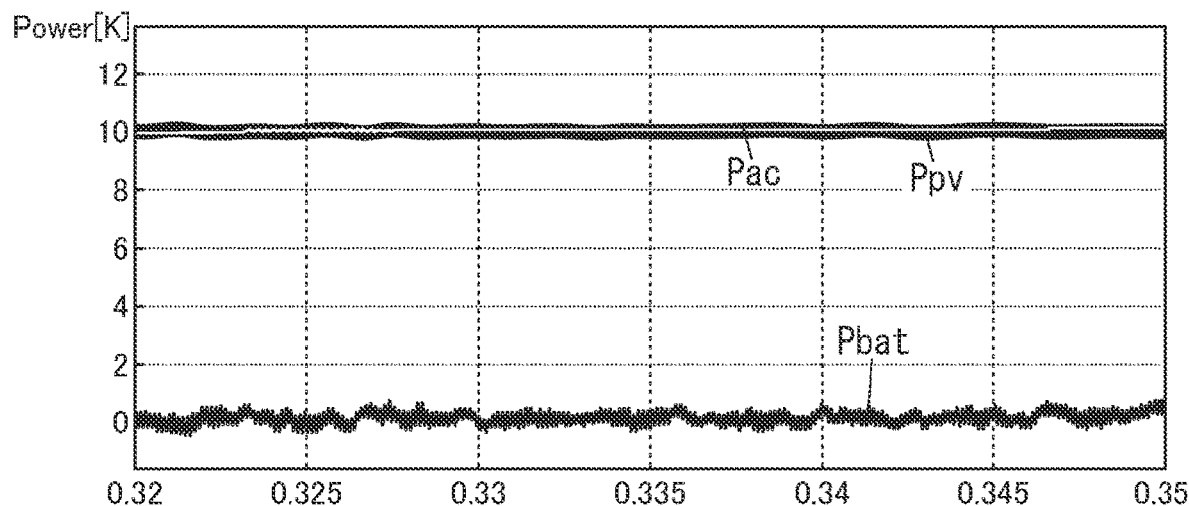

FIG. 7 is an enlarged waveform chart showing a part of the operation in the inverter mode of the power conversion system 10 according to this embodiment shown in FIGS. 8A-8C. FIGS. 8A-8C is still another set of waveform diagrams showing the results of simulations of the power conversion system that were carried out with the output power of the second circuit 2 set at 10 kW, the output power of the third circuit 3 set at 0 kW, and the output power (discharge power) of the first circuit 1 set at 10 kW. FIG. 8A shows the waveforms of currents, FIG. 8B shows the waveforms of voltages, and FIG. 8C shows the waveforms of powers. In this example, the voltage Vbat across the storage battery 80 was 320 V, the voltage Vpv across the solar battery 70 was 300 V, and the voltage Vlink between the terminals P1, N1 was 380 V. Also, the primary winding 331 and the secondary winding 332 of the transformer 33 had a turns ratio of 1:1.2. Note that the voltage Vlink between the terminals P1, N1 shown in FIG. 8B is an average value. According to the data shown in FIG. 8C, the output power (discharge power) of the first circuit 1 was 10 kW, the output power of the second circuit 2 was 10 kW, and the output power of the third circuit 3 was 0 kW. It can be seen that the power was transmitted as designed. Among these results, attention should be paid to the fact that according to the data shown in FIG. 7, the output current I3 of the third circuit 3 had a time average value of 0 A and the output power of the third circuit 3 was 0 kW. As can be seen, even when the output of the third circuit 3 is 0 kW, an output voltage VT having a rectangular waveform may still be output. Also, even if the connection unit 7 is provided with no smoothing capacitors, the power may still be transmitted between the first circuit 1 and the second circuit 2.

(4) Variations

Note that the first embodiment described above is only an exemplary one of various embodiments of the present disclosure and should not be construed as limiting. Rather, the first embodiment may be readily modified in various manners depending on a design choice or any other factor without departing from the scope of the present disclosure. Next, variations of the first embodiment will be enumerated one after another.

In the power conversion system 10 according to the present disclosure, the control circuit 6 thereof, for example, includes a computer system. The computer system may include a processor and a memory as principal hardware components. The functions of the power conversion system 10 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). Those electronic circuits may be either integrated together on a single chip or distributed on multiple chips, whichever is appropriate. Those multiple chips may be integrated together in a single device or distributed in multiple devices without limitation.

Also, in the embodiment described above, the plurality of constituent elements of the power conversion system 10 are housed in a single housing. However, this is not an essential configuration for the power conversion system 10. Alternatively, those constituent elements of the power conversion system 10 may be distributed in multiple different housings. Still alternatively, at least some functions of the power conversion system 10 (e.g., the function of the control circuit 6) may be implemented as a server system or a cloud computing system as well.

(4.1) First Variation

Figure 9A:
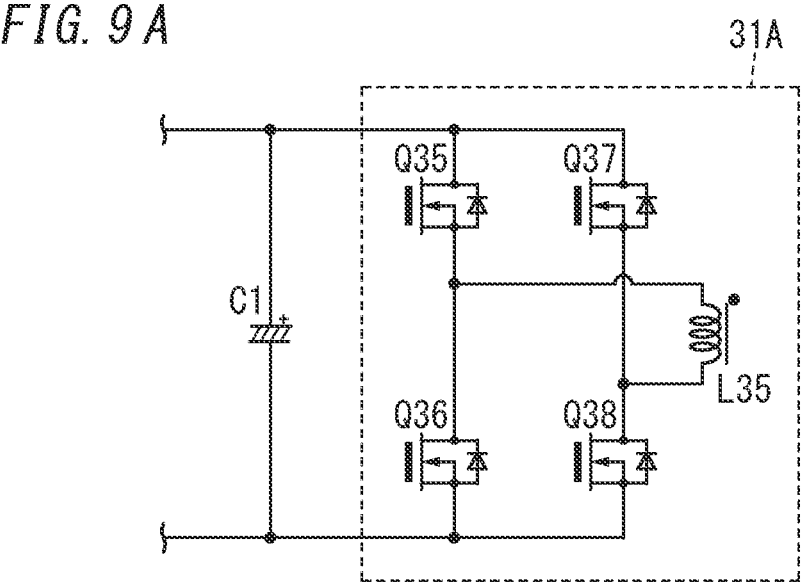
FIGS. 9A and 9B are circuit diagrams illustrating exemplary configurations for a primary-side circuit of a virtual DC voltage generator circuit according to a first variation of the first embodiment of the present disclosure.
Figure 9B:
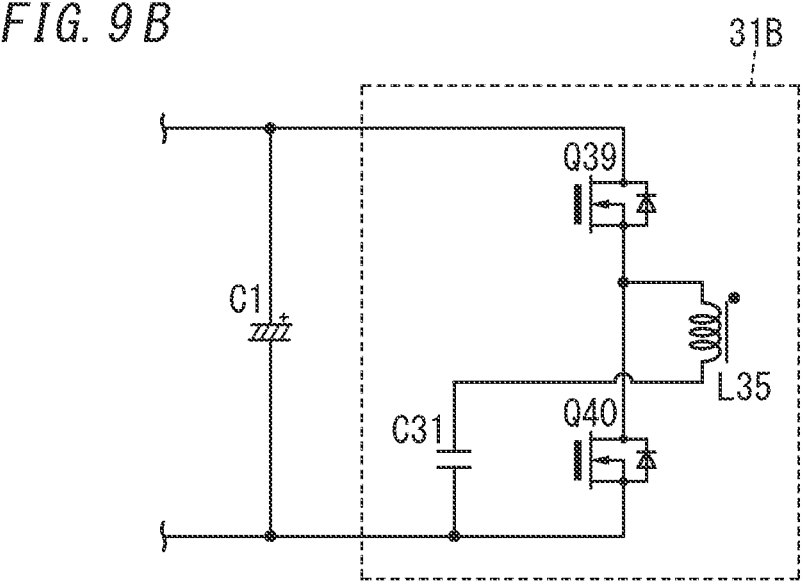
Figure 10:
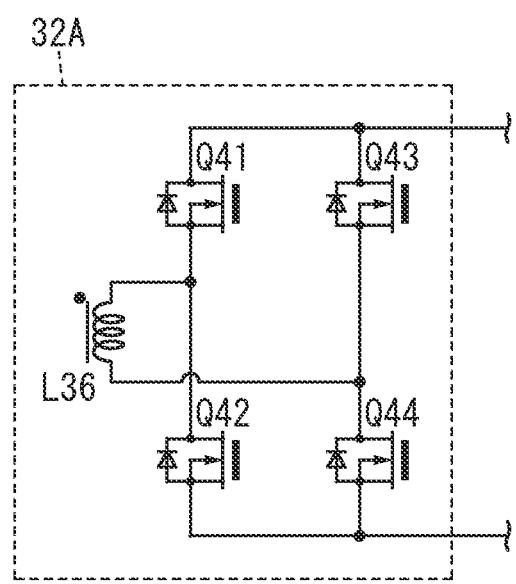
FIG. 10 is a circuit diagram showing an exemplary configuration for a secondary-side circuit of the virtual DC voltage generator circuit.

In the first embodiment described above, the third circuit 3 is implemented as a converter circuit of a center tap type. Alternatively, the third circuit 3 may include either a primary-side circuit 31A or a primary-side circuit 31B instead of the primary-side circuit 31 as shown in FIGS. 9A and 9B. In addition, the third circuit 3 may include a secondary-side circuit 32A instead of the secondary-side circuit 32 as shown in FIG. 10. That is to say, the third circuit 3 may include one of the primary-side circuits 31, 31A, 31B and one of the secondary-side circuits 32, 32A. In other words, the third circuit 3 may be a combination of one of the primary-side circuits 31, 31A, 31B and one of the secondary-side circuits 32, 32A. The power conversion system 10 according to the first variation will be described with reference to FIGS. 9A, 9B, and 10. Note that the power conversion system 10 according to the first variation has the same configuration as the power conversion system 10 according to the first embodiment except the third circuit 3. Thus, any constituent element of this first variation, having the same function as a counterpart of the first embodiment described above, will be designated by the same reference numeral as that counterpart's, and description thereof will be omitted herein.

The power conversion system 10 according to the first variation includes the first circuit 1, the second circuit 2, and the third circuit 3. In addition, the power conversion system 10 further includes the filter circuit 4, the snubber circuit 5, the control circuit 6, and the connection unit 7. Moreover, the power conversion system 10 further includes the two first DC terminals T11, T12, the two second DC terminals T21, T22, and the three AC terminals T31, T32, T33.

The primary-side circuit 31A of the third circuit 3 includes four third switching elements Q35-Q38 and a winding L35 as shown in FIG. 9A.

Each of the third switching elements Q35-Q38 may be, for example, a depletion mode n-channel MOSFET. The third switching element Q35 having the higher potential is electrically connected in series to the third switching element Q36 having the lower potential across the capacitor C1. The third switching element Q37 having the higher potential is electrically connected in series to the third switching element Q38 having the lower potential across the capacitor C1. That is to say, a series circuit of the third switching elements Q35, Q36 and a series circuit of the third switching elements Q37, Q38 are electrically connected in parallel across the capacitor C1.

Each of the third switching elements Q35-Q38 includes a parasitic diode. The parasitic diode of each of the third switching elements Q35-Q38 has its anode electrically connected to the source of an associated one of the third switching elements Q35-Q38 and has its cathode electrically connected to the drain of the associated one of the third switching elements Q35-Q38.

Each of the third switching elements Q35, Q37 having the higher potential has its drain electrically connected to the second DC terminal T21 having the higher potential. Each of the third switching elements Q36, Q38 having the lower potential has its source electrically connected to the second DC terminal T22 having the lower potential. Also, the third switching element Q35 having the higher potential has its source electrically connected to the drain of the third switching element Q36 having the lower potential. Likewise, the third switching element Q37 having the higher potential has its source electrically connected to the drain of the third switching element Q38 having the lower potential.

The winding L35 has its first terminal electrically connected to the node of connection between the third switching elements Q35, Q36. The winding L35 has its second terminal electrically connected to the node of connection between the third switching elements Q37, Q38.

Meanwhile, the primary-side circuit 31B of the third circuit 3 includes two third switching elements Q39, Q40, a capacitor C31, and the winding L35 as shown in FIG. 9B.

Each of the third switching elements Q39, Q40 may be, for example, a depletion mode n-channel MOSFET. The third switching element Q39 having the higher potential is electrically connected in series to the third switching element Q40 having the lower potential across the capacitor C1. That is to say, a series circuit of the third switching elements Q39, Q40 is electrically connected across the capacitor C1.

Each of the third switching elements Q39, Q40 includes a parasitic diode. The parasitic diode of each of the third switching elements Q39, Q40 has its anode electrically connected to the source of an associated one of the third switching elements Q39, Q40 and has its cathode electrically connected to the drain of the associated one of the third switching elements Q39, Q40.

The third switching element Q39 having the higher potential has its drain electrically connected to the second DC terminal T21 having the higher potential. The third switching element Q40 having the lower potential has its source electrically connected to the second DC terminal T22 having the lower potential. Also, the third switching element Q39 having the higher potential has its source electrically connected to the drain of the third switching element Q40 having the lower potential.

The winding L35 has its first terminal electrically connected to the node of connection between the third switching elements Q39, Q40. The winding L35 has its second terminal electrically connected to the second DC terminal T22 having the lower potential via the capacitor C31.

The secondary-side circuit 32A of the third circuit 3 includes four third switching elements Q41-Q44 and a winding L36 as shown in FIG. 10.

Each of the third switching elements Q41-Q44 may be, for example, a depletion mode n-channel MOSFET. The third switching element Q41 having the higher potential is electrically connected in series to the third switching element Q42 having the lower potential between the terminals P1, N1. The third switching element Q43 having the higher potential is electrically connected in series to the third switching element Q44 having the lower potential between the terminals P1, N1. That is to say, a series circuit of the third switching elements Q41, Q42 and a series circuit of the third switching elements Q43, Q44 are electrically connected in parallel between the terminals P1, N1.

Each of the third switching elements Q41-Q44 includes a parasitic diode. The parasitic diode of each of the third switching elements Q41-Q44 has its anode electrically connected to the source of an associated one of the third switching elements Q41-Q44 and has its cathode electrically connected to the drain of the associated one of the third switching elements Q41-Q44.

Each of the third switching elements Q41, Q43 having the higher potential has its drain electrically connected to the terminal P1 having the higher potential. Each of the third switching elements Q42, Q44 having the lower potential has its source electrically connected to the terminal N1 having the lower potential. Also, the third switching element Q41 having the higher potential has its source electrically connected to the drain of the third switching element Q42 having the lower potential. Likewise, the third switching element Q43 having the higher potential has its source electrically connected to the drain of the third switching element Q44 having the lower potential.

The winding L36 has its first terminalis electrically connected to the node of connection between the third switching elements Q41, Q42. The winding L36 has its second terminal electrically connected to the node of connection between the third switching elements Q43, Q44.

Even when these primary-side circuits 31A, 31B and secondary-side circuit 32A are used, a DC voltage corresponding to the flat range W12 may still be generated between the terminals P1, N1. Thus, even in this variation, the first circuit 1 and the second circuit 2 may still be electrically connected on the DC side with no smoothing capacitors used.

(4.2) Second Variation

The power conversion system 10 may include any one of snubber circuits 5A-5D instead of the snubber circuit 5. The power conversion system 10 according to a second variation will be described with reference to FIGS. 11A-11D. Note that the power conversion system 10 according to the second variation has the same configuration as the power conversion system 10 according to the first embodiment except the snubber circuit 5A-5D. Thus, any constituent element of this second variation, having the same function as a counterpart of the first embodiment described above, will be designated by the same reference numeral as that counterpart's, and description thereof will be omitted herein.

The power conversion system 10 according to the second variation includes the first circuit 1, the second circuit 2, and the third circuit 3. In addition, the power conversion system 10 further includes the filter circuit 4, any one of the snubber circuits 5A-5D, the control circuit 6, and the connection unit 7. Moreover, the power conversion system 10 further includes the two first DC terminals T11, T12, the two second DC terminals T21, T22, and the three AC terminals T31, T32, T33.

Figure 11A:
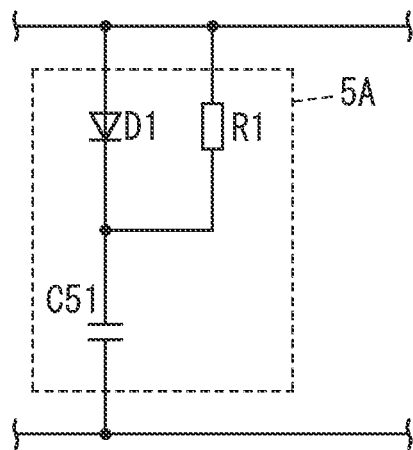
FIGS. 11A-11D are circuit diagrams illustrating exemplary configurations for a snubber circuit for use in a power conversion system according to a second variation of the first embodiment of the present disclosure.

The snubber circuit 5A includes a diode D1, a resistor R1, and a capacitor CM as shown in FIG. 11A. The diode D1 is electrically connected in series to the capacitor CM between the terminals P1, N1. The diode D1 has its anode electrically connected to the terminal P1 and has its cathode electrically connected to the terminal N1 via the capacitor CM. The resistor R1 is electrically connected between the anode and cathode of the diode D1. In this snubber circuit 5A, the electrical energy stored in the capacitor CM is consumed by the resistor R1.

Figure 11B:
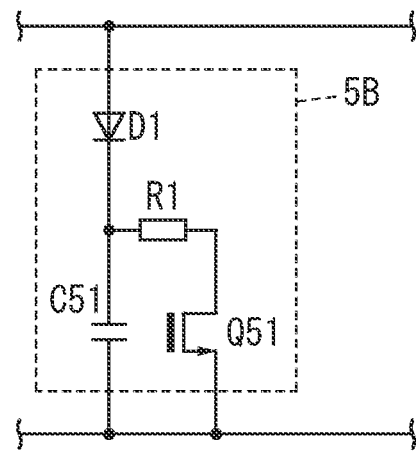

The snubber circuit 5B includes the diode D1, the resistor R1, the capacitor CM, and a switching element Q51 as shown in FIG. 11B. The diode D1 is electrically connected in series to the capacitor C51 between the terminals P1, N1. The diode D1 has its anode electrically connected to the terminal P1 and has its cathode electrically connected to the terminal N1 via the capacitor CM. The resistor R1 has its first terminal electrically connected to the node of connection between the diode D1 and the capacitor C51 and has its second terminal electrically connected to the terminal N1 via the switching element Q51. In this snubber circuit 5B, the electrical energy stored in the capacitor C51 is consumed by the resistor R1 when the switching element Q51 is turned ON.

Figure 11C:
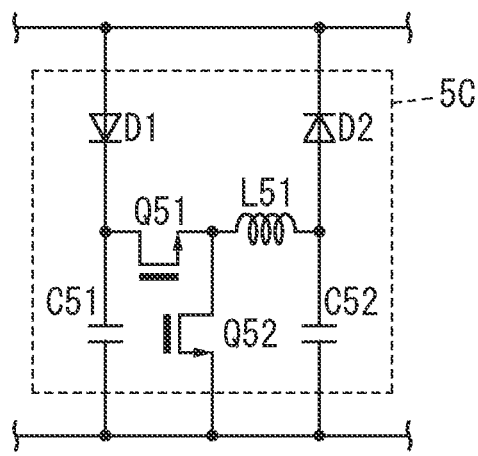

The snubber circuit 5C includes a plurality of (e.g., two in the example illustrated in FIG. 11C) diodes D1, D2, an inductor L51, a plurality of (e.g., two in the example illustrated in FIG. 11C) capacitors CM, C52, and a plurality of (e.g., two in the example illustrated in FIG. 11C) switching elements Q51, Q52 as shown in FIG. 11C. The diode D1 is electrically connected in series to the capacitor CM between the terminals P1, N1. The diode D2 is electrically connected in series to the capacitor C52 between the terminals P1, N1. The diode D1 has its anode electrically connected to the terminal P1 and has its cathode electrically connected to the terminal N1 via the capacitor CM. The diode D2 has its anode electrically connected to the terminal N1 via the capacitor C52 and has its cathode electrically connected to the terminal P1.

That is to say, the diodes D1 and D2 are connected in mutually opposite directions between the terminals P1, N1. The inductor L51 has its first terminal electrically connected to the node of connection between the diode D1 and the capacitor C51 via the switching element Q51 and has its second terminal electrically connected to the node of connection between the diode D2 and the capacitor C52. The switching element Q52 is electrically connected between the terminal N1 and the node of connection between the switching element Q51 and the inductor L51. In this snubber circuit 5C, a step-down chopper circuit is formed by the switching elements Q51, Q52 and the inductor L51. In this snubber circuit 5C, the voltage across the capacitor C1 is stepped down by turning the switching elements Q51, Q52 ON and OFF and electrical energy corresponding to the stepped down voltage across the capacitor C51 is stored in the capacitor C52.

Figure 11D:
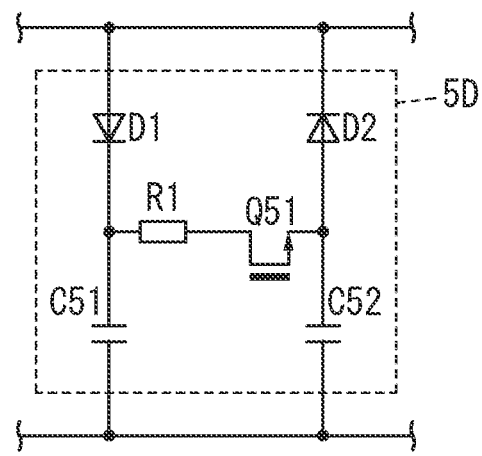

The snubber circuit 5D includes the plurality of (e.g., two in the example illustrated in FIG. 11D) diodes D1, D2, the resistor R1, the plurality of (e.g., two in the example illustrated in FIG. 11D) capacitors C51, C52, and the switching element Q51 as shown in FIG. 11D. The diode D1 is electrically connected in series to the capacitor CM between the terminals P1, N1. The diode D2 is electrically connected in series to the capacitor C52 between the terminals P1, N1. The diode D1 has its anode electrically connected to the terminal P1 and has its cathode electrically connected to the terminal N1 via the capacitor C51. The diode D2 has its anode electrically connected to the terminal N1 via the capacitor C52 and has its cathode electrically connected to the terminal P1. That is to say, the diodes D1 and D2 are connected in mutually opposite directions between the terminals P1, N1. The resistor R1 has its first terminal electrically connected to the node of connection between the diode D1 and the capacitor C51 and has its second terminal electrically connected to the node of connection between the diode D2 and the capacitor C52 via the switching element Q51. In this snubber circuit 5D, the electrical energy stored in the capacitor C51 is stored in the capacitor C52 via the resistor R1 when the switching element Q51 is turned ON.

Even in the snubber circuits 5A-5D, when the bus voltage Vbus between the terminals P1, N1 exceeds a first clamp value Vclp1, part of the electrical energy in excess of the first clamp value Vclp1 is absorbed through the terminals P1, N1, thereby clamping an upper limit value of the bus voltage Vbus at the first clamp value Vclp1. Also, in the snubber circuits 5C, 5D, when the bus voltage Vbus becomes lower than a second clamp value Vclp2 (<Vclp1), the electrical energy is injected (regenerated) into the terminals P1, N1, thereby clamping the lower limit value of the bus voltage Vbus at the second clamp value Vclp2.

Therefore, providing the power conversion system 10 with any of the snubber circuits 5A-5D instead of the snubber circuit 5 may reduce the chances of ringing or a surge voltage being generated in the power conversion system 10.

(4.3) Third Variation

Other variations of the first embodiment will be enumerated one after another.

The first embodiment has been described mainly about the operation in the inverter mode. However, almost the same statement is applicable to the operation in the converter mode as well.

Also, in the first embodiment described above, the power conversion system 10 has the two operation modes, namely, the inverter mode and the converter mode. However, this is not an essential feature for the power conversion system 10. Alternatively, the power conversion system 10 may have only the inverter mode as its operation mode or only the converter mode as its operation mode. In other words, the power conversion system 10 does not have to be configured to convert power bidirectionally but may also be configured to convert power only unidirectionally.

Optionally, to each of the first switching elements Q11-Q16, the second switching elements Q21, Q22, and the third switching elements Q31-Q34, an external diode may be connected instead of the parasitic diode. Furthermore, each of the first switching elements Q11-Q16, the second switching elements Q21, Q22, and the third switching elements Q31-Q34 does not have to be a MOSFET but may also be an npn-type insulated gate bipolar transistor, for example. In that case, the diode is electrically connected between the emitter and collector of the bipolar transistor in such a direction in which a current is allowed to flow in the opposite direction from a current flowing through a switching element in ON state.

Furthermore, the control circuit 6 does not have to be a microcomputer but may also be implemented as, for example, a central processing unit (CPU), a field-programmable gate array (FPGA), an application specific integrated circuit (ASIC), or any other appropriate type of circuit.

Optionally, the first time length that is the length of the period T4 from the beginning of the first period T1 through the beginning of the inversion period Td1 may be equal to the second time length that is the length of the period T3 from the end of the inversion period Td1 through the end of the first period T1.

Optionally, the snubber circuit 5, 5A, 5B, 5C, 5D may be omitted. Furthermore, in the first embodiment, the snubber circuit 5 is connected between the terminals P1, N1 and the first circuit 1. Alternatively, the snubber circuit 5, 5A, 5B, 5C, 5D may also be connected, for example, between the second circuit 2 and the terminal P1, N1 or between the third circuit 3 and the terminal P1, N1.

Furthermore, in the first embodiment described above, the second circuit 2 is a synchronous rectification step-up chopper circuit. Alternatively, the second circuit 2 may also be an asynchronous rectification step-up chopper circuit. Still alternatively, the second circuit 2 may also be an insulated step-up chopper circuit.

Optionally, the connection unit 7 may include a smoothing capacitor.

Furthermore, the AC power supply or AC load electrically connected to the first external terminal of the first circuit 1 may have a single phase. In that case, the first circuit 1 is implemented as four first switching elements which are bridge-connected together.

Second Embodiment

Figure 12:
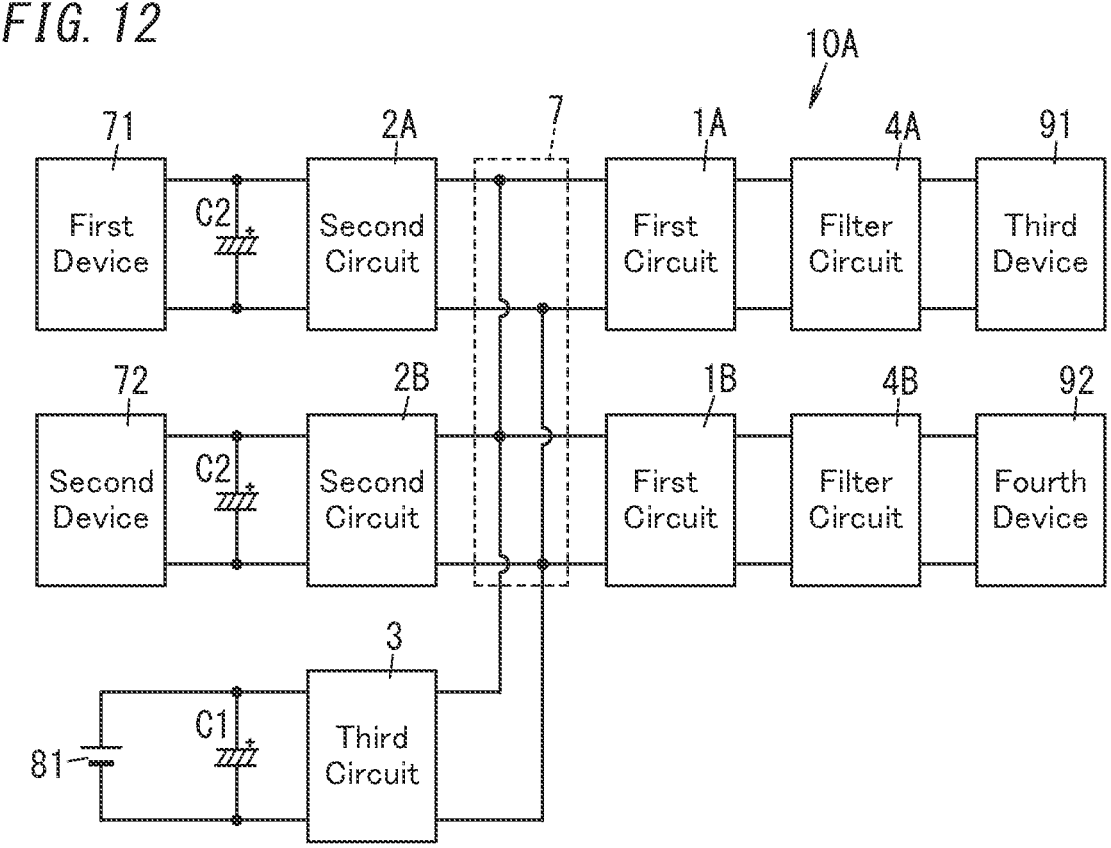
FIG. 12 is a block diagram illustrating a configuration for a power conversion system according to a second embodiment of the present disclosure.
Figure 13:
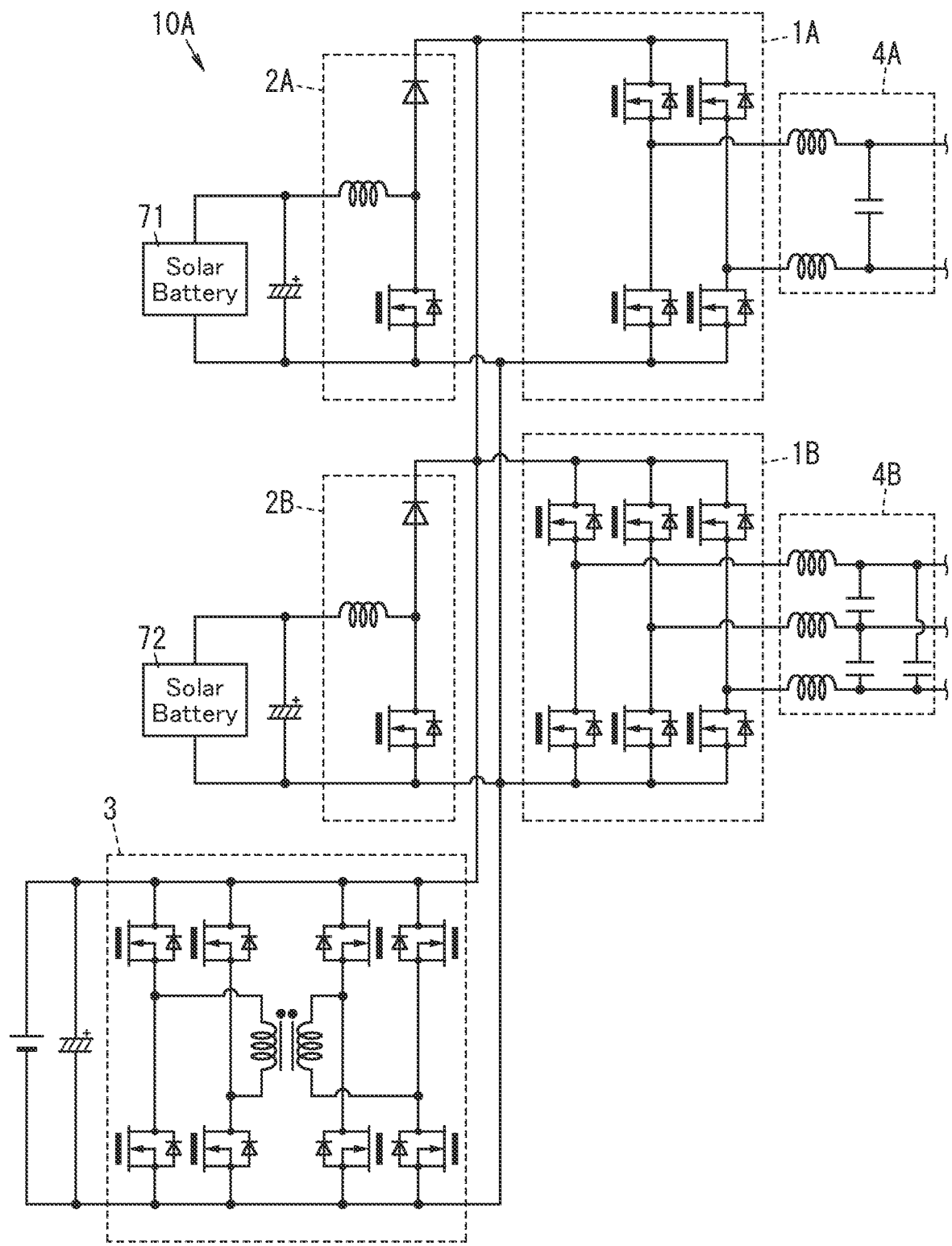
FIG. 13 is a circuit diagram illustrating a configuration for the power conversion system.

In the power conversion system 10 according to the first embodiment, the single third circuit 3 is connected to the single first circuit 1 and the single second circuit 2. Alternatively, the single third circuit 3 may be connected to two first circuits 1A, 1B and two second circuits 2A, 2B as shown in FIGS. 12 and 13. A power conversion system 10A according to a second embodiment will be described with reference to FIGS. 12 and 13. Note that each of the first circuits 1A, 1B, the second circuits 2A, 2B, and the third circuit 3 of the power conversion system 10A according to the second embodiment is the same as a corresponding one of the first circuit 1, second circuit 2, and third circuit 3 of the power conversion system 10 according to the first embodiment described above. Thus, in the following description, any constituent element of this second embodiment, having the same function as a counterpart of the first embodiment described above, will be designated by the same reference numeral as that counterpart's, and description thereof will be omitted herein. Also, in FIGS. 12 and 13, illustration of the snubber circuit 5 and the control circuit 6 is omitted for the sake of simplicity.

The power conversion system 10A according to the second embodiment includes a plurality of (e.g., two in this embodiment) first circuits 1A, 1B, a plurality of (e.g., two in this embodiment) second circuits 2A, 2B, and a single third circuit 3 as shown in FIGS. 12 and 13. In addition, the power conversion system 10A further includes a plurality of (e.g., two in this embodiment) filter circuits 4A, 4B, a plurality of snubber circuits 5, the control circuit 6, and the connection unit 7. The plurality of first circuits 1A, 1B, the plurality of second circuits 2A, 2B, the plurality of filter circuits 4A, 4B, and the plurality of snubber circuits 5 correspond one to one.

Each of the plurality of second circuits 2 has one end thereof electrically connected to either a first device 71 or a second device 72. Each of the first device 71 and the second device 72 may be any one of a solar battery, a storage battery, or a fuel cell. Alternatively, each of the first device 71 and the second device 72 may also be implemented as, for example, a converter circuit which may serve as a DC power supply. Still alternatively, each of the first device 71 and the second device 72 may also be an electric circuit, a load device, or an electric motor, for example, which receives a DC voltage as an input voltage.

Each of the plurality of second circuits 2 has the other end thereof electrically connected to an associated one of the plurality of first circuits 1 via the connection unit 7. That is to say, in the power conversion system 10A according to the second embodiment, the plurality of second circuits 2 and the plurality of first circuits 1 are electrically connected to the same connection unit 7. Each of the plurality of first circuits 1 has the other end, opposite from the second circuits 2, electrically connected to the plurality of filter circuits 4. Each of the plurality of filter circuits 4 is electrically connected to either a third device 91 or a fourth device 92. Each of the third device 91 and the fourth device 92 may be an AC power grid, for example. Alternatively, each of the third device 91 and the fourth device 92 may also be an electric circuit, a load device, or an electric motor, for example, which receives an AC voltage as an input voltage.

The third circuit 3 has one end thereof electrically connected to a DC power supply 81. The DC power supply 81 may be any one of a solar battery, a storage battery, or a fuel cell. Alternatively, the DC power supply 81 may also be implemented as, for example, a converter circuit which may serve as a DC power supply. The third circuit 3 has the other end thereof electrically connected to the connection unit 7. That is to say, in the power conversion system 10A according to the second embodiment, the plurality of first circuits 1, the plurality of second circuits 2, and the single third circuit 3 are electrically connected to the same connection unit 7.

In the power conversion system 10A according to the second embodiment, the two first circuits 1A, 1B, the two second circuits 2A, 2B, and the single third circuit 3 are electrically connected to the same connection unit 7. The third circuit 3 allows the connection unit 7 (terminal P1, N1) to generate a DC voltage corresponding to the flat range W12 of the output voltage VT. This allows the plurality of first circuits 1A, 1B and the plurality of second circuits 2A, 2B to be electrically connected on the DC side with no smoothing capacitors used.

In the second embodiment, both the number of the first circuits 1A, 1B provided and the number of the second circuits 2A, 2B provided are two. However, this is only an example of the present disclosure and should not be construed as limiting. Alternatively, the number of the first circuits provided and the number of the second circuits provided may each be three or more.

(Recapitulation)

As can be seen from the foregoing description, a power conversion system (10; 10A) according to a first aspect includes a first circuit (1) and a second circuit (2) and transmits DC power between a first internal terminal (111, 112) of the first circuit (1) and a second internal terminal (211, 212) of the second circuit (2). The first circuit (1) includes the first internal terminal (111, 112) and a first external terminal (113-115) and has the first external terminal (113-115) electrically connected to either an AC power supply or an AC load. The second circuit (2) includes at least the second internal terminal (211, 212). The power conversion system (10; 10A) further includes a third circuit (3). The third circuit (3) includes a third internal terminal (341, 342) and a third external terminal (343, 344). In the power conversion system (10; 10A), the first internal terminal (111, 112), the second internal terminal (211, 212), and the third internal terminal (341, 342) are electrically connected to the same connection unit (7). The third circuit (3) includes a switching element (Q31-Q34) and a transformer (33) electrically connected to the switching element (Q31-Q34). The third circuit (3) provides an output voltage (VT) across a secondary winding (332) of the transformer (33) via the switching element (Q31-Q34) and the transformer (33). The secondary winding (332) is electrically connected to the third internal terminal (341, 342). The output voltage (VT) has a waveform (W1) including a rising range (W11), a falling range (W13), and a flat range (W12). In the rising range (W11), the output voltage (VT) changes from a first potential (VT1) to a second potential (VT2) higher than the first potential (VT1). In the falling range (W13), the output voltage (VT) changes from the second potential (VT2) to the first potential (VT1). In the flat range (W12), the output voltage (VT) is maintained at either the first potential (VT1) or the second potential (VT2).

This aspect allows a DC voltage, corresponding to the flat range (W12) of the output voltage (VT) generated across the secondary winding (332) of the transformer (33) of the third circuit (3), to be generated in the connection unit (7). Thus, a plurality of circuits (namely, the first circuit 1 and the second circuit 2) may be connected on the DC side with no smoothing capacitors used.

In a power conversion system (10; 10A) according to a second aspect, which may be implemented in conjunction with the first aspect, the connection unit (7) includes no smoothing capacitors.

This aspect allows the overall size of the power conversion system (10; 10A) to be reduced compared to a situation where the connection unit (7) includes a smoothing capacitor.

A power conversion system (10; 10A) according to a third aspect, which may be implemented in conjunction with the first or second aspect, further includes a snubber circuit (5; 5A; 5B; 5C; 5D) electrically connected to the connection unit (7).

This aspect may reduce ringing or surge voltage to be generated in the power conversion system (10; 10A).

In a power conversion system (10; 10A) according to a fourth aspect, which may be implemented in conjunction with any one of the first to third aspects, the first circuit (1) includes a first switching element (Q11-Q16) different from a third switching element (Q31-Q34) serving as the switching element. The second circuit (2) includes a second switching element (Q21, Q22) different from the first switching element (Q11-Q16) and the third switching element (Q31-Q34). The first circuit (1) is configured to supply a first output current (I1) having a rectangular waveform to the first internal terminal (111) by controlling ON/OFF states of the first switching element (Q11-Q16). The second circuit (2) is configured to supply a second output current (I2) having a rectangular waveform to the second internal terminal (211) by controlling ON/OFF states of the second switching element (Q21, Q22).

This aspect may reduce a residual current to be caused by leakage inductance of the transformer (33).

In a power conversion system (10; 10A) according to a fifth aspect, which may be implemented in conjunction with the fourth aspect, a first drive signal (Sig5-Sig10), a second drive signal (Sig11, Sig12), and a third drive signal (Sig1-Sig4) are in synch with each other. The first drive signal (Sig5-Sig10) is a signal for turning the first switching element (Q11-Q16) ON or OFF. The second drive signal (Sig11, Sig12) is a signal for turning the second switching element (Q21, Q22) ON or OFF. The third drive signal (Sig1-Sig4) is a signal for turning the third switching element (Q31-Q34) ON or OFF.

This aspect allows the third switching element Q31-Q34 to make zero-current switching (soft switching), which is always stabilized without depending on a load current.

In a power conversion system (10; 10A) according to a sixth aspect, which may be implemented in conjunction with the fifth aspect, either a timing to turn the first switching element (Q11-Q16) ON or a timing to turn the first switching element (Q11-Q16) OFF is in synch with either a timing to turn the second switching element (Q21, Q22) ON or a timing to turn the second switching element (Q21, Q22) OFF.

This aspect may reduce the ringing voltage to be generated by leakage inductance of the transformer (33), thus cutting down the power loss.

In a power conversion system (10; 10A) according to a seventh aspect, which may be implemented in conjunction with any one of the fourth to sixth aspects, each of the first circuit (1) and the second circuit (2) is configured to transmit no power to the third circuit (3) during a first period (T1; T1a; T1b) including an inversion period (Td1) in which polarity of voltage applied to a primary winding (331) of the transformer (33) inverts.

This aspect allows the third circuit (3) to make zero-current switching, which is always stabilized without depending on a load current, thus cutting down the switching loss.

In a power conversion system (10; 10A) according to an eighth aspect, which may be implemented in conjunction with the seventh aspect, a first time length is equal to or greater than a second time length. The first time length defines length of a period from a beginning of the first period (T1) through a beginning of the inversion period (Td1). The second time length defines length of a period from an end of the inversion period (Td1) through an end of the first period (T1).

This aspect may increase the first time length, thus reducing the chances of a residual current (trailing current) falling upon the inversion period (Td1) and thereby reducing the chances of the transformer (33) having biased magnetization.

A power conversion system (10; 10A) according to a ninth aspect, which may be implemented in conjunction with any one of the fourth to eighth aspects, further includes a control circuit (6). The control circuit (6) turns, on detecting any abnormality in one of the first circuit (1) or the second circuit (2), the third switching element (Q31-Q34) OFF when a predetermined period of time passes since at least one of the first switching element (Q11-Q16) or the second switching element (Q21, Q22)) has been turned OFF.

This aspect allows the stress caused to the third switching element (Q31-Q34) to be reduced by regenerative energy, compared to a situation where the third switching element (Q31-Q34) is turned OFF at the timing to turn the first switching element (Q11-Q16) and the second switching element (Q21, Q22) OFF.

A power conversion system (10A) according to a tenth aspect, which may be implemented in conjunction with any one of the first to ninth aspects, includes: a plurality of first circuits (1A, 1B); and a plurality of second circuits (2A, 2B). The first internal terminal (111, 112) of each of the plurality of first circuits (1A, 1B), the second internal terminal (211, 212) of each of the plurality of second circuits (2A, 2B), and the third internal terminal (341, 342) of the third circuit (3) are electrically connected to the connection unit (7).

This aspect allows the plurality of first circuits (1A, 1B) and the plurality of second circuits (2A, 2B) to be electrically connected on the DC side with no smoothing capacitors used.

A virtual DC voltage generator circuit (3) according to an eleventh aspect is used as the third circuit (3) in the power conversion system (10; 10A) according to any one of the first to tenth aspects.

This aspect allows a DC voltage, corresponding to the flat range (W12) of the output voltage (VT) generated across the secondary winding (332) of the transformer (33) of the virtual DC voltage generator circuit (3), to be generated in the connection unit (7). Thus, a plurality of circuits (namely, the first circuit 1 and the second circuit 2) may be connected on the DC side with no smoothing capacitors used.

Note that the constituent elements according to the second to tenth aspects are not essential constituent elements for the power conversion system (10; 10A) but may be omitted as appropriate.

REFERENCE SIGNS LIST

1 First Circuit
111, 112 First Internal Terminal
113-115 First External Terminal
Q11-Q16 First Switching Element
2 Second Circuit
211, 212 Second Internal Terminal
213, 214 Second External Terminal
Q21, Q22 Second Switching Element
3 Third Circuit (DC Voltage Generator Circuit)
33 Transformer
341, 342 Third Internal Terminal
343, 344 Third External Terminal
Q31-Q34 Third Switching Element (Switching Element)
5, 5A, 5B, 5C, 5D Snubber Circuit
6 Control Circuit
7 Connection Unit 10, 10A Power Conversion System
I1 First Output Current
I2 Second Output Current
T1 First Period
Td1 Inversion Period
VT Output Voltage
VT1 First Potential
VT2 Second Potential
W1 Waveform of Output Voltage
W11 Rising Range
W12 Flat Range
W13 Falling Range

The invention claimed is:

1. A power conversion system comprising:
a first circuit including a first internal terminal and a first external terminal and having the first external terminal electrically connected to either an AC power supply or an AC load; and
a second circuit including at least a second internal terminal,
the power conversion system being configured to transmit power between the first internal terminal of the first circuit and the second internal terminal of the second circuit,
the power conversion system further comprising a third circuit including a third internal terminal and two third external terminals,
the first internal terminal, the second internal terminal, and the third internal terminal being electrically connected to a same connection unit,
the third circuit including a switching element and a transformer electrically connected to the switching element, the third circuit being configured to provide an output voltage across a secondary winding of the transformer via the switching element and the transformer,
the secondary winding being electrically connected to the third internal terminal,
at least one element including a primary side switching element as the switching element is electrically connected in series between at least one of the two third external terminals and at least one of both ends of a primary winding of the transformer, and the at least one element is an element other than a coil and a capacitor,
at least one element including a secondary side switching element as the switching element is electrically connected in series between the connection unit and at least one of both ends of a secondary winding of the transformer, and the at least one element is an element other than a coil and a capacitor,
the output voltage having a waveform including:
a rising range in which the output voltage changes from a first potential to a second potential higher than the first potential;
a falling range in which the output voltage changes from the second potential to the first potential; and
a flat range in which the output voltage is maintained at either the first potential or the second potential.

2. The power conversion system of claim 1, wherein the connection unit includes no smoothing capacitors.

3. The power conversion system of claim 2, further comprising a snubber circuit electrically connected to the connection unit.

4. The power conversion system of claim 2, wherein the first circuit includes a first switching element, the first switching element being different from a third switching element serving as the switching element,
the second circuit includes a second switching element, the second switching element being different from the first switching element and the third switching element,
the first circuit is configured to supply a first output current having a rectangular waveform to the first internal terminal by controlling ON/OFF states of the first switching element, and
the second circuit is configured to supply a second output current having a rectangular waveform to the second internal terminal by controlling ON/OFF states of the second switching element.

5. The power conversion system of claim 4, wherein a first drive signal for turning the first switching element ON or OFF, a second drive signal for turning the second switching element ON or OFF, and a third drive signal for turning the third switching element ON or OFF are in synch with each other.

6. The power conversion system of claim 1, further comprising a snubber circuit electrically connected to the connection unit.

7. The power conversion system of claim 6, wherein the first circuit includes a first switching element, the first switching element being different from a third switching element serving as the switching element,
the second circuit includes a second switching element, the second switching element being different from the first switching element and the third switching element,
the first circuit is configured to supply a first output current having a rectangular waveform to the first internal terminal by controlling ON/OFF states of the first switching element, and
the second circuit is configured to supply a second output current having a rectangular waveform to the second internal terminal by controlling ON/OFF states of the second switching element.

8. The power conversion system of claim 7, wherein a first drive signal for turning the first switching element ON or OFF, a second drive signal for turning the second switching element ON or OFF, and a third drive signal for turning the third switching element ON or OFF are in synch with each other.

9. The power conversion system of claim 1, wherein the first circuit includes a first switching element, the first switching element being different from a third switching element serving as the switching element,
the second circuit includes a second switching element, the second switching element being different from the first switching element and the third switching element,
the first circuit is configured to supply a first output current having a rectangular waveform to the first internal terminal by controlling ON/OFF states of the first switching element, and
the second circuit is configured to supply a second output current having a rectangular waveform to the second internal terminal by controlling ON/OFF states of the second switching element.

10. The power conversion system of claim 9, wherein a first drive signal for turning the first switching element ON or OFF, a second drive signal for turning the second switching element ON or OFF, and a third drive signal for turning the third switching element ON or OFF are in synch with each other.

11. The power conversion system of claim 10, wherein either a timing to turn the first switching element ON or a timing to turn the first switching element OFF is in synch with either a timing to turn the second switching element ON or a timing to turn the second switching element OFF.

12. The power conversion system of claim 9, wherein each of the first circuit and the second circuit is configured to transmit no power to the third circuit during a first period including an inversion period in which polarity of voltage applied to a primary winding of the transformer inverts.

13. The power conversion system of claim 12, wherein a first time length defining length of a period from a beginning of the first period through a beginning of the inversion period is equal to or greater than a second time length defining length of a period from an end of the inversion period through an end of the first period.

14. The power conversion system of claim 9, further comprising a control circuit configured to turn, on detecting any abnormality in one of the first circuit or the second circuit, the third switching element OFF when a predetermined period of time passes since at least one of the first switching element or the second switching element has been turned OFF.

15. The power conversion system of claim 1, wherein
the power conversion system includes: a plurality of first circuits, one of which is the first circuit; and a plurality of second circuits, one of which is the second circuit, and
the first internal terminal of each of the plurality of first circuits, the second internal terminal of each of the plurality of second circuits, and the third internal terminal of the third circuit are electrically connected to the connection unit.

16. A virtual DC voltage generator circuit for use as the third circuit in the power conversion system of claim 1.

17. A power conversion system comprising:
a first circuit including a first internal terminal and a first external terminal and having the first external terminal electrically connected to either an AC power supply or an AC load; and
a second circuit including at least a second internal terminal,
the power conversion system being configured to transmit power between the first internal terminal of the first circuit and the second internal terminal of the second circuit,
the power conversion system further comprising a third circuit including a third internal terminal and a third external terminal,
the first internal terminal, the second internal terminal, and the third internal terminal being electrically connected to a same connection unit,
the third circuit including a switching element and a transformer electrically connected to the switching element, the third circuit being configured to provide an output voltage across a secondary winding of the transformer via the switching element and the transformer,
the secondary winding being electrically connected to the third internal terminal,
the output voltage having a waveform including:
a rising range in which the output voltage changes from a first potential to a second potential higher than the first potential;
a falling range in which the output voltage changes from the second potential to the first potential; and
a flat range in which the output voltage is maintained at either the first potential or the second potential, wherein
the first circuit includes a first switching element, the first switching element being different from a third switching element serving as the switching element,
the second circuit includes a second switching element, the second switching element being different from the first switching element and the third switching element,
the first circuit is configured to supply a first output current having a rectangular waveform to the first internal terminal by controlling ON/OFF states of the first switching element, and
the second circuit is configured to supply a second output current having a rectangular waveform to the second internal terminal by controlling ON/OFF states of the second switching element.

* * * * *